(12) United States Patent
Haj-Maharsi et al.

(10) Patent No.: US 9,768,704 B2
(45) Date of Patent: Sep. 19, 2017

(54) HYBRID DISTRIBUTION TRANSFORMER HAVING A POWER ELECTRONIC MODULE FOR CONTROLLING INPUT POWER FACTOR AND OUTPUT VOLTAGE

(75) Inventors: Mohamed Y. Haj-Maharsi, Garner, NC (US); Le Tang, Cary, NC (US); Rafael Gutierrez, Wytheville, VA (US); Sandeep Bala, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 929 days.

(21) Appl. No.: 12/701,235

(22) Filed: Feb. 5, 2010

(65) Prior Publication Data

US 2010/0201338 A1    Aug. 12, 2010

Related U.S. Application Data

(60) Provisional application No. 61/150,591, filed on Feb. 6, 2009, provisional application No. 61/163,311, filed on Mar. 25, 2009.

(51) Int. Cl.
| | |
|---|---|
| *G05F 3/04* | (2006.01) |
| *H02M 5/10* | (2006.01) |
| *H02M 1/42* | (2007.01) |
| *H02M 5/45* | (2006.01) |
| *H02M 5/458* | (2006.01) |

(52) U.S. Cl.
CPC ........... *H02M 5/10* (2013.01); *H02M 1/4233* (2013.01); *H02M 5/4505* (2013.01); *H02M 5/4585* (2013.01); *Y02B 70/126* (2013.01)

(58) Field of Classification Search
CPC .... H02M 1/4233; H02M 5/10; H02M 5/4585; H02M 5/4505; Y02B 70/126; G05F 3/04

USPC ..... 323/205–208, 267; 363/34–37, 148–173; 307/45–49
See application file for complete search history.

(56) References Cited

U.S. PATENT DOCUMENTS

| | | |
|---|---|---|
| 3,564,390 A | 2/1971 | Stratton |
| 4,007,416 A | 2/1977 | Szatmari |
| 4,086,526 A | 4/1978 | Grudelbach |
| 4,255,782 A | 3/1981 | Joyce |
| 4,562,382 A | 12/1985 | Elliott |
| 4,774,451 A | 9/1988 | Mehnert et al. |

(Continued)

FOREIGN PATENT DOCUMENTS

| | | |
|---|---|---|
| CN | 101335457 A | 12/2008 |
| JP | 10084674 | 3/1998 |

(Continued)

OTHER PUBLICATIONS

Bruno Georges and Jacques Aubin, Application of PLC for on-line monitoring of power transformers, Power Engineering Society Winter Meeting, 2001, IEEE, vol. 2, pp. 483-486.*

(Continued)

*Primary Examiner* — Gustavo Rosario Benitez
(74) *Attorney, Agent, or Firm* — Taft Stettinius & Hollister LLP

(57) ABSTRACT

A hybrid transformer is provided that includes an electromagnetic transformer and an AC-AC converter with a DC bridge. The AC-AC converter is operable to keep the input voltage and current of the hybrid transformer substantially in phase and to reduce fluctuation in the output voltage of the hybrid transformer in the event of an increase or decrease in the input voltage.

26 Claims, 21 Drawing Sheets

(56) References Cited

U.S. PATENT DOCUMENTS

| | | | | |
|---|---|---|---|---|
| 5,166,869 A * | 11/1992 | Hesterman | | H02M 3/337 363/24 |
| 5,179,508 A * | 1/1993 | Lange et al. | | 363/16 |
| 5,329,222 A * | 7/1994 | Gyugyi | | H02J 3/1814 307/102 |
| 5,514,915 A | 5/1996 | Kim et al. | | |
| 5,570,279 A | 10/1996 | Venkataramanan | | |
| 5,625,545 A | 4/1997 | Hammond | | |
| 5,724,236 A | 3/1998 | Oglesbee | | |
| 5,747,972 A | 5/1998 | Baretich et al. | | |
| 5,905,367 A | 5/1999 | Hochgraf | | |
| 5,943,229 A | 8/1999 | Sudhoff | | |
| 5,949,221 A | 9/1999 | Edwards | | |
| 5,991,168 A * | 11/1999 | Farrington et al. | | 363/16 |
| 6,005,788 A | 12/1999 | Lipo et al. | | |
| 6,288,915 B1 | 9/2001 | Stemmier et al. | | |
| 6,304,006 B1 * | 10/2001 | Jungreis | | 307/64 |
| 6,310,787 B2 | 10/2001 | Ito et al. | | |
| 6,340,851 B1 | 1/2002 | Rinaldi et al. | | |
| 6,472,851 B2 | 10/2002 | Hammond | | |
| 6,490,178 B1 | 12/2002 | Asayama | | |
| 6,542,390 B2 | 4/2003 | Bixel | | |
| 6,545,453 B2 | 4/2003 | Glinkowski et al. | | |
| 6,559,562 B1 | 5/2003 | Rostron | | |
| 6,750,563 B2 | 6/2004 | Rostron et al. | | |
| 6,770,984 B2 * | 8/2004 | Pai | | H02M 5/2573 307/46 |
| 6,879,062 B2 | 4/2005 | Oates | | |
| 6,954,366 B2 | 10/2005 | Lai et al. | | |
| 6,987,331 B2 | 1/2006 | Koeppe et al. | | |
| 6,995,992 B2 | 2/2006 | Wei et al. | | |
| 7,049,921 B2 | 5/2006 | Owen | | |
| 7,050,311 B2 | 5/2006 | Lai et al. | | |
| 7,362,007 B2 | 4/2008 | Farmer | | |
| 7,495,410 B2 | 2/2009 | Zargari et al. | | |
| 7,495,935 B2 | 2/2009 | Chen et al. | | |
| 7,622,825 B2 | 11/2009 | Brune et al. | | |
| 2004/0084965 A1 * | 5/2004 | Welches et al. | | 307/64 |
| 2005/0111245 A1 * | 5/2005 | Lai et al. | | 363/125 |
| 2005/0201127 A1 * | 9/2005 | Tracy et al. | | 363/37 |
| 2006/0006850 A1 * | 1/2006 | Inoue et al. | | 323/265 |
| 2006/0028848 A1 | 2/2006 | Lai et al. | | |
| 2006/0131960 A1 * | 6/2006 | Aritsuka | | H02J 3/1814 307/17 |
| 2006/0132062 A1 * | 6/2006 | Maru et al. | | 315/291 |
| 2006/0221653 A1 * | 10/2006 | Lai et al. | | 363/37 |
| 2007/0096703 A1 * | 5/2007 | Jain | | 323/282 |
| 2007/0151272 A1 | 7/2007 | Cosan et al. | | |
| 2007/0223258 A1 | 9/2007 | Lai et al. | | |
| 2007/0230226 A1 | 10/2007 | Lai et al. | | |
| 2009/0001940 A1 | 1/2009 | Sihler et al. | | |
| 2009/0212758 A1 * | 8/2009 | Asinovski et al. | | 323/355 |
| 2010/0220499 A1 | 9/2010 | Haj-Maharsi | | |
| 2012/0087157 A1 * | 4/2012 | Huang | | H02M 7/5387 363/37 |

FOREIGN PATENT DOCUMENTS

| | | |
|---|---|---|
| JP | 2004104909 | 4/2004 |
| WO | 2010091260 | 8/2010 |

OTHER PUBLICATIONS

IEEE, IEEE Standard 100-2000, Year 2000, p. 791, Digital Object Identifier: 10.1109/IEEESTD.2000.322221.*

L.-S.Lai,A.Maitra,A.Mansoor, and F.Goodmann,"Multilevel Intelligent Universal Transformer for Medium Voltage Applications," in Conf.Rec. of IEEE IAS Annual Meeting, Hong Kong, China Oct. 2005 pp. 1893-1899.

J.-S.Lai,A.Maitra, A.Mansoor, and F.Goodmann,"Performance of a Distribution Intelligent Universal Transformer under Source and Load Disturbances," in Conf.Rec.of IEEE IAS,41st. Annual Meeting, Tampa, FL, Oct. 2006 pp. 719-725.

Ronan, JR., E.Sudhoff, S.,Glover,S., and D.Galloway,"A Power Electronic-Based Distribution Transformer," IEEE Transactions on Power Delivery, Apr. 2002, pp. 537-543.

Oscar C. Montero-Hernandez and Prasad N. Enjeti,"Ride-Through for Critical Loads-Exporing a Low Cost to maintaining Continuous Connections between buildings and/or industrial systems," IEEE Industry Applications Magazine—Nov./Dec. 2002—www.IEEE. ORG/IAS.

Z.Fedyczak, J.Kaniewski and M.Klyta,"Single-Phase Hybrid Transformer Using Matrix-Reactance Chopper with Cuk Topolog," in Power Electronics and Applications, 2007 European Conference, Aalborg,Denmark, pp. 1-10.

Jih-Sheng Lai,"Designing The Next Generation Distribution Transformers: New Power Electronic-Based Hybrid and Solid-State Design Approaches,"Proceedings of the Latest International Conference Power and Energy Systems, Feb. 24-26, 2003, Palm Springs, CA pp. 262-267.

M.Kang, P.Enjeti and I.Pitel,Analysis and Design of Electronic Transformers for Electronic Power Distribution System in IEEE Industry Applications Society Annual Meeting, New Orleans, LA Oct. 5-7, 1977.

E.C.Aeloiza, P.N.Enjeti, L.A.Moran and I.Pitel,"Next Generation Distribution Transformer:To Address Power Quality for Critical Loads," in Power Electronics Specialist Conference, 2003, PESC'03. 2003 IEEE 34th Annual Meeting pp. 1266-1271.

Z.Fedyczak and J.Kaniewski,Modeling and Analysis of Three-Phase Hybrid Transformer Using matrix Converter,in Compatibility in Power Electronics, 2007, CPE'07, Gdansk, Poland pp. 1-6.

E.R.Ronan.,Jr., S.D.Sudhoff, S.F.Glover and D.L.Galloway,"Application of Power Electronics To The Distribution Transformer," in Applied Power Electronics Conference and Exposition, 2000. APEC2000. 15th Annual, New Orleans, LA., Feb. 6-10., pp. 861-867.

P.K.Banerjee, M.A.Choudhury and Golam Toasha Rasul,"AC Voltage Regulation by Switch Mode Buck-Boost Voltage Controller," vol. EE 31, No. I&II, Dec. 2004, pp. 27-31.

A.Julian, D.Divan, T.Lipo, F.Nozari, P.Mezs,"Double Bride Resonant DC Link Converter with Variable Input and Output Frequency," Research Report 96-07, University of Wisconsin-Madison, College of Engineering, Madison, WI 53706-1691.

J.-S.Lai, A.Hefner, A.Maitra and F.Goodmann,Characterization of a Multilevel HV-IGBT Module for Distribution Applications,in Industry Applications Conference, 2006. 41st. IAS Annual Meeting, Conference Record.Tampa, FL. pp. 747-753.

Hefner et al., "Recent Advances in High-Voltage, High-Frequency Silicon-Carbide Power Devices" The 2006 IEEE Industry Applications Conference Forty-First IAS Annual Meeting, Conference Record of, IEEE, Piscataway, NJ, US, Oct. 1, 2006 (Oct. 1, 2006), pp. 330-337, XP031026053, ISBN: 978-1-4244-0364-6.

"Feasibility Assessment for Intelligent Universal Transformer," TR-1001698, Final Report, Dec. 2002,EPRI, 3412 Hillview Av Palo Alto, California 94304., www.epri.com.

Amendment "B"—U.S. Appl. No. 12/713,766.
Second Office Action—U.S. Appl. No. 12/713,766.
Amendment "A"—U.S. Appl. No. 12/713,766.
First Office Action—U.S. Appl. No. 12/713,766.
Chinese Office Action, CN201080009629.2, Nov. 6, 2015.
Chinese Office Action, CN201080009629.2, Nov. 6, 2015, English Translation.

* cited by examiner

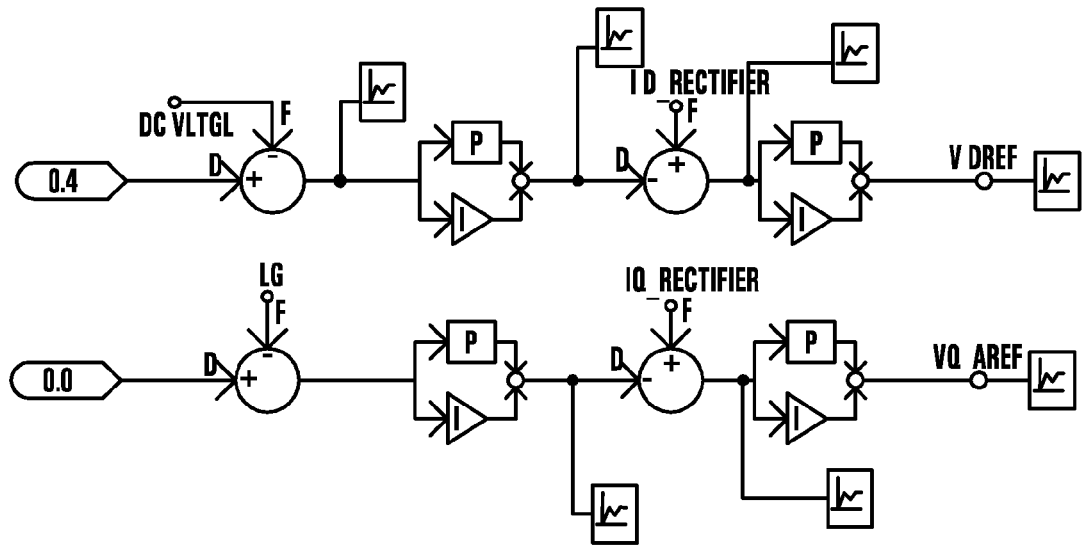
Fig. 8
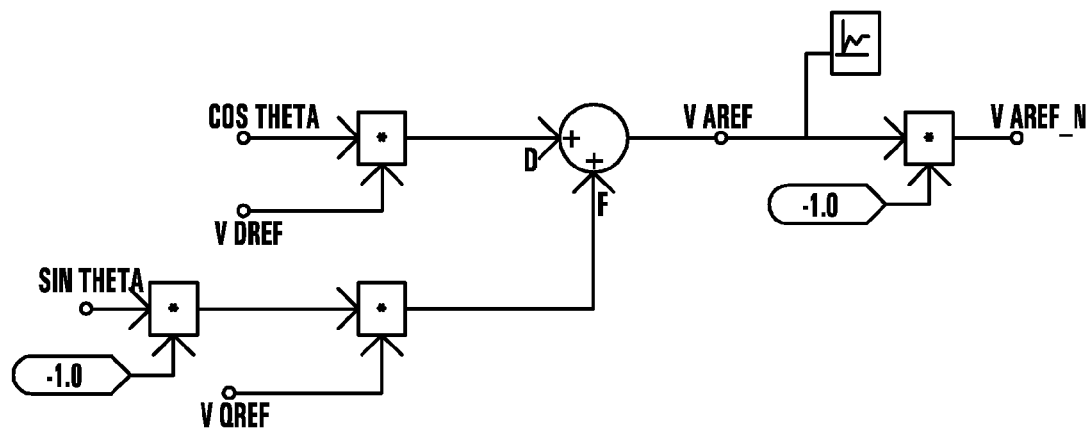
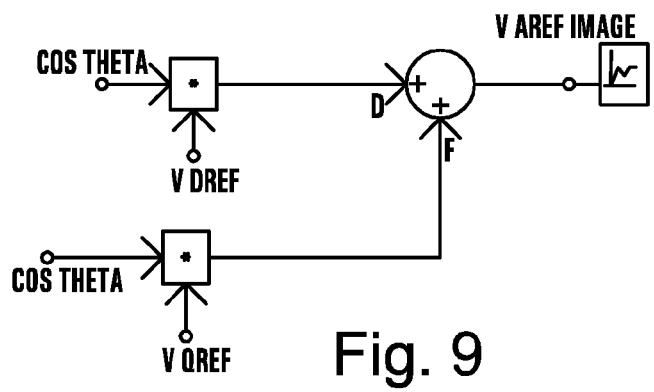
Fig. 9

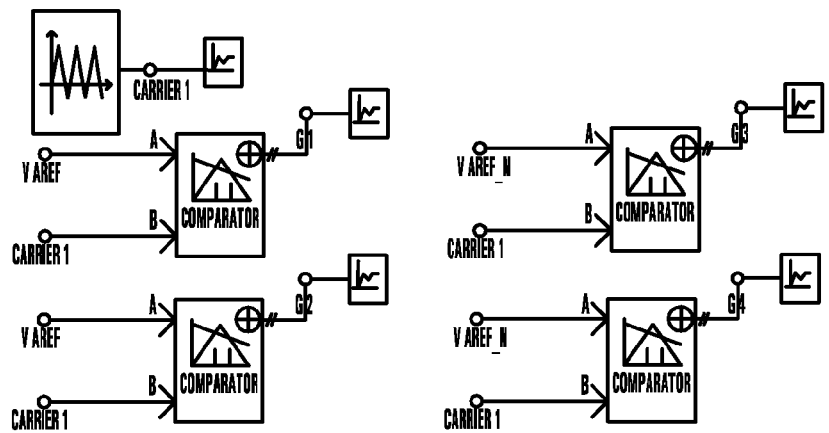
Fig. 10
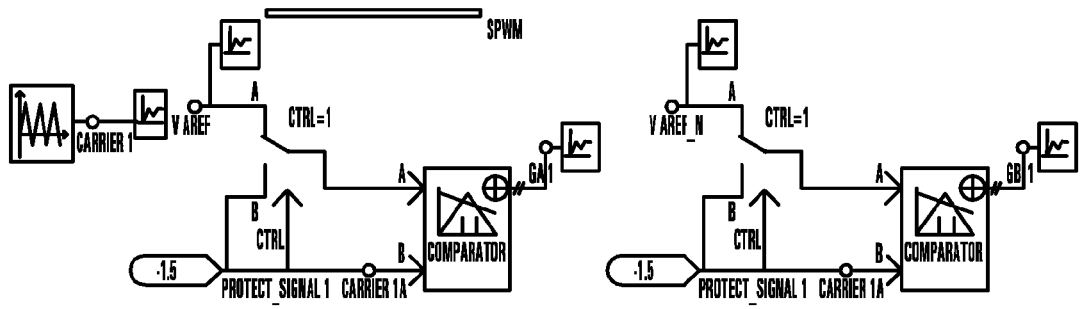
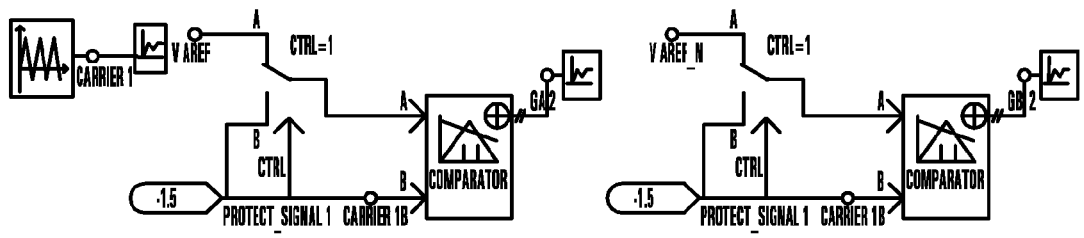
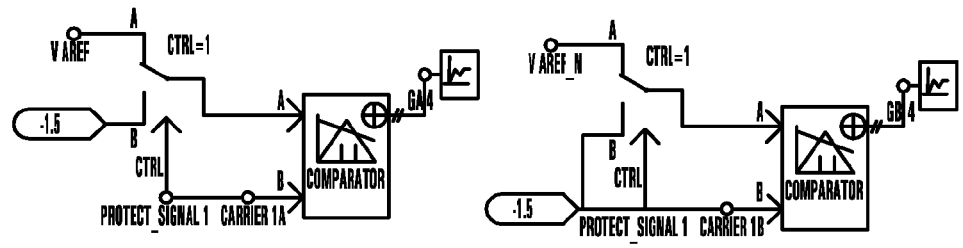
Fig. 11

HYBRID DISTRIBUTION TRANSFORMER HAVING A POWER ELECTRONIC MODULE FOR CONTROLLING INPUT POWER FACTOR AND OUTPUT VOLTAGE

CROSS-REFERENCE TO RELATED APPLICATION

This application claims the benefit of U.S. provisional patent application No. 61/150,591 filed on Feb. 6, 2009 and U.S. provisional patent application No. 61/163,311 filed on Mar. 25, 2009, both of which are hereby incorporated by reference in their entirety.

BACKGROUND OF THE INVENTION

This invention relates to transformers and more particularly to a hybrid distribution transformer utilizing power electronics.

Modern society's movement into the digital age is necessitating the development of a more reliable supply of high-quality electricity. An indispensible component in the supply of electricity to end-users is a distribution transformer. A conventional distribution transformer converts electricity at one voltage to electricity at another voltage, either of higher or lower value. A transformer achieves this voltage conversion using a primary winding and a secondary winding, each of which is wound on a ferromagnetic core and comprises a number of turns of an electrical conductor. A conventional distribution transformer employed in present day power distribution systems cannot protect digital loads against poor power quality, such as sags/swells/distortion. It is estimated that voltage disturbances cost millions of dollars every year to industries around the world.

Sometimes systems are connected to a power distribution line to improve power quality. Examples of such systems include dynamic voltage restorers (DVRs) and static VAR compensators (SVCs). DVRs sustain or restore an operational electric load during sags or spikes in voltage supply, while SVCs provide fast-acting reactive power compensation on power networks. DVRs and SVCs are often "add on" systems that are connected to, and used with, conventional distribution transformers.

More recently, it has been proposed to combine power electronics with a conventional distribution transformer to improve power quality. The present invention is directed to such a transformer.

SUMMARY OF THE INVENTION

In accordance with the present invention, a hybrid transformer is provided. The hybrid transformer has a primary side for receiving an input voltage and current from a source and a secondary side for providing an output voltage and current to a load. The hybrid transformer includes an AC-AC converter, a ferromagnetic core and first, second and third windings wound around the core. At least one of the first, second and third windings is a primary winding for connection to the source, and at least one of the first, second and third windings is a secondary winding for connection to the load. The AC-AC converter includes a first switching bridge connected to the first winding, a second switching bridge connected in series with the second winding and a DC bridge connected between the first and second switching bridges, and a controller. In one aspect, the controller is operable to control the first and second switching bridges to control the power factor on the primary side of the hybrid transformer and to reduce variations in the output voltage in the event of a change in the input voltage. In another aspect, the controller is operable to control the first switching bridge to control the DC voltage across the DC bridge.

Also provided in accordance with the present invention is another hybrid transformer having a primary side for receiving an input voltage and current from a source and a secondary side for providing output voltage and current to a load. The hybrid transformer includes a ferromagnetic core and first and second windings wound around the core. The first winding has opposing ends, a plurality of turns disposed between the ends and a tap connected to one of the turns. The tap helps define winding portions of the first winding. One of the first and second windings is a primary winding for connection to the source, and the other one of the first and second windings is a secondary winding for connection to the load. A power electronic module is connected to the tap of the first winding. A control device is operable to control the power electronic module to regulate variations in the output voltage and control the power factor on the primary side of the hybrid transformer.

BRIEF DESCRIPTION OF THE DRAWINGS

The features, aspects, and advantages of the present invention will become better understood with regard to the following description, appended claims, and accompanying drawings where:

FIG. 8 shows functional block diagrams for the d-q vector control;

FIG. 9 shows functional block diagrams for the D-Q to a (a imaginary) transformation;

FIG. 10 shows functional block diagrams for the generation of gating signals for the first AC-AC converter;

FIG. 11 shows functional block diagrams for gating signals for the second AC-AC converter;

DETAILED DESCRIPTION OF ILLUSTRATIVE EMBODIMENTS

Figure 1:
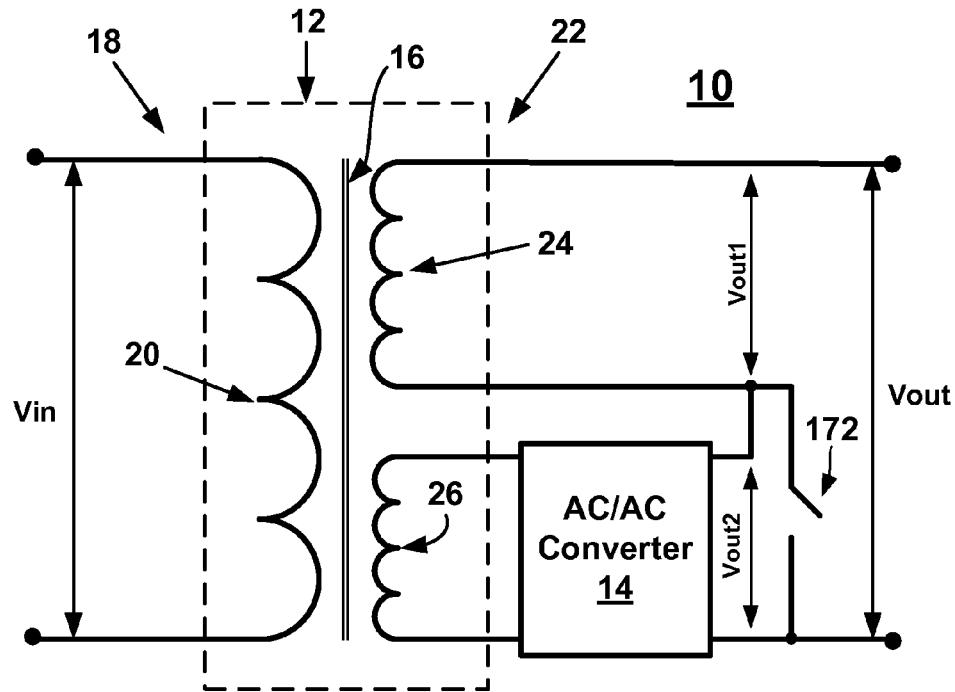
FIG. 1 shows a schematic circuit of a first hybrid transformer constructed in accordance with a first embodiment of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

The present invention is directed to a hybrid transformer that may be used in the distribution of power. The hybrid transformer generally includes an electromagnetic transformer and a power electronic AC-AC converter. The electromagnetic transformer includes a ferromagnetic core, a primary winding structure and a secondary winding structure, each of which are wound on the ferromagnetic core. The primary winding structure comprises one or more primary windings and the secondary winding structure comprises one or more secondary windings. The electromagnetic transformer may be a liquid-filled transformer, wherein the core and the primary and secondary winding structures are immersed in a dielectric fluid, or the electromagnetic transformer may be a dry type transformer, wherein the core and the primary and secondary winding structures are not immersed in a dielectric fluid, but, instead, are encased in a dielectric resin or surrounded by an inert gas, or simply ambient air. The hybrid transformer may be a single phase transformer, a three phase transformer, or a multiphase (>3 phases) transformer. The hybrid transformer may be pole-mounted or pad-mounted.

Figure 2:
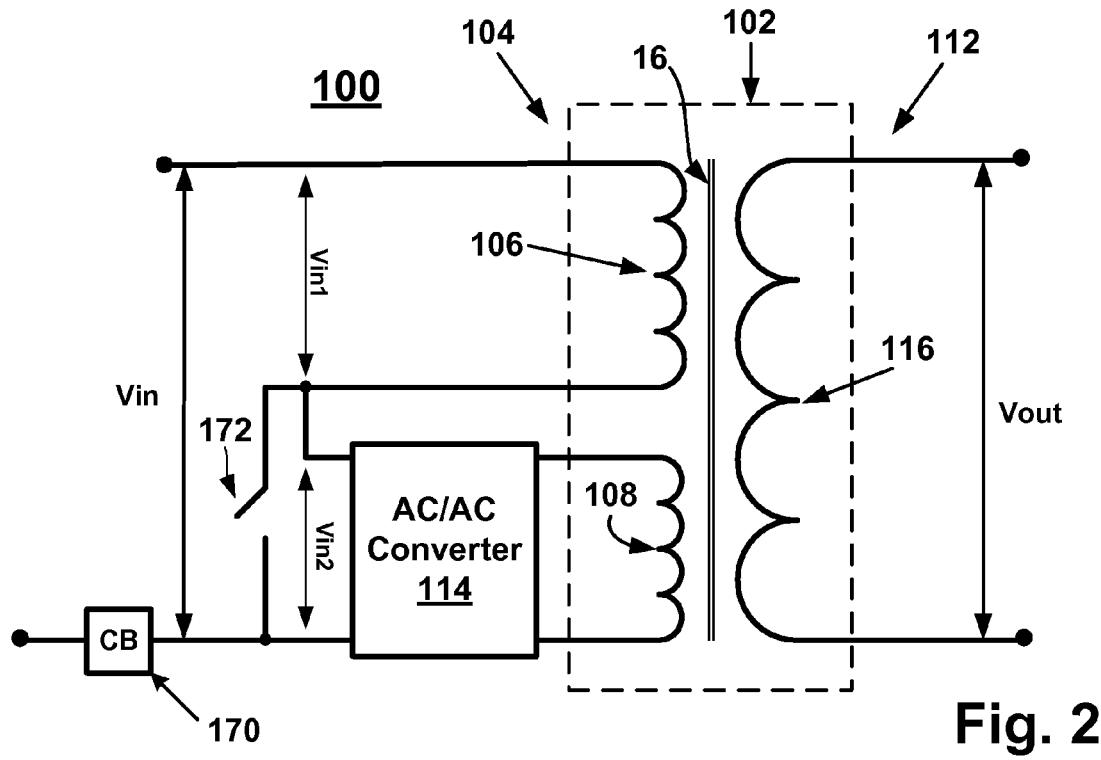
FIG. 2 shows a schematic circuit of a second hybrid transformer constructed in accordance with a second embodiment of the present invention.

Two embodiments of a hybrid transformer constructed in accordance with the present invention are shown in FIGS. 1 and 2 and are designated by the reference numerals 10, 100, respectively. The hybrid transformer 10, 100 includes an electromagnetic transformer 12, 102 integrated with an AC-AC converter 14, 114. The electromagnetic transformer 12, 102 includes a ferromagnetic core 16 and at least three windings. For example: one primary winding and two secondary windings, or two primary windings and one secondary winding. The hybrid transformer 10, 100 may be a single phase transformer that has a power rating of about 67 kVA and a voltage rating of about 7.97 kV to 277 V.

The AC-AC converter 14, 114 can be connected into the primary winding structure or the secondary winding structure. If the AC-AC converter 14, 114 is connected into the primary winding structure, the primary winding structure comprises at least two primary windings and if the AC-AC converter 14, 114 is connected into the secondary winding structure, the secondary winding structure comprises at least two secondary windings. The winding on a side (primary or secondary) whose ends are connected to the AC-AC converter 14, 114 shall be referred to as a proximate winding and the other winding(s) on the side shall be referred as distal winding(s).

As shown in FIG. 1, the hybrid transformer 10 includes the electromagnetic transformer 12, which has a primary winding structure 18 with a single primary winding 20 and a secondary winding structure 22 with two secondary windings 24, 26. The AC-AC converter 14 is connected to ends of the secondary winding 26 and is connected in series with the secondary winding 24. The voltage $V_{out}$ across the secondary winding structure is equal to the voltage $V_{out1}$ across the secondary winding 24 plus the voltage $V_{out2}$ across the AC-AC converter 14. Under normal operating conditions, the secondary winding 24 produces 100% of the output voltage to the load. When required, the secondary winding 26 can produce up to 20% of the output voltage to the load. The hybrid transformer 10 may be constructed such that the primary winding 20 can support a voltage of 8.66 kV, the secondary winding 24 can produce a voltage of 277 V and the secondary winding 26 can produce a voltage of 55.4 V, which corresponds to 20% of the voltage of winding 24.

As shown in FIG. 2, the hybrid transformer 100 includes the electromagnetic transformer 102, which has a primary winding structure 104 with two primary windings 106, 108 and a secondary winding structure 112 with a single secondary winding 116. The AC-AC converter 114 is connected to ends of the primary winding 108 and is connected in series with the primary winding 106. The voltage $V_{in}$ across the primary winding structure is equal to the voltage $V_{in1}$ across the primary winding 106 plus the voltage $V_{in2}$ across the AC-AC converter 114. The primary winding structure 104 is constructed such that, under normal conditions, the primary winding 106 supports 100% of the input voltage. When required, the primary winding 108 can support about 20% of the input voltage. The hybrid transformer 100 may be constructed such that the primary winding 106 can support a voltage of 7.97 kV, the primary winding 108 can support a voltage of 1.59 kV, the secondary winding 116 can provide a voltage of 277 V and there is a leakage reactance of 0.1 pu. Since the input voltage equals the voltage output from the AC-AC converter 114 plus the voltage of the primary winding 106, control of the voltage output from the AC-AC converter 114 controls the input voltage and, thus, the output voltage.

Figure 3:
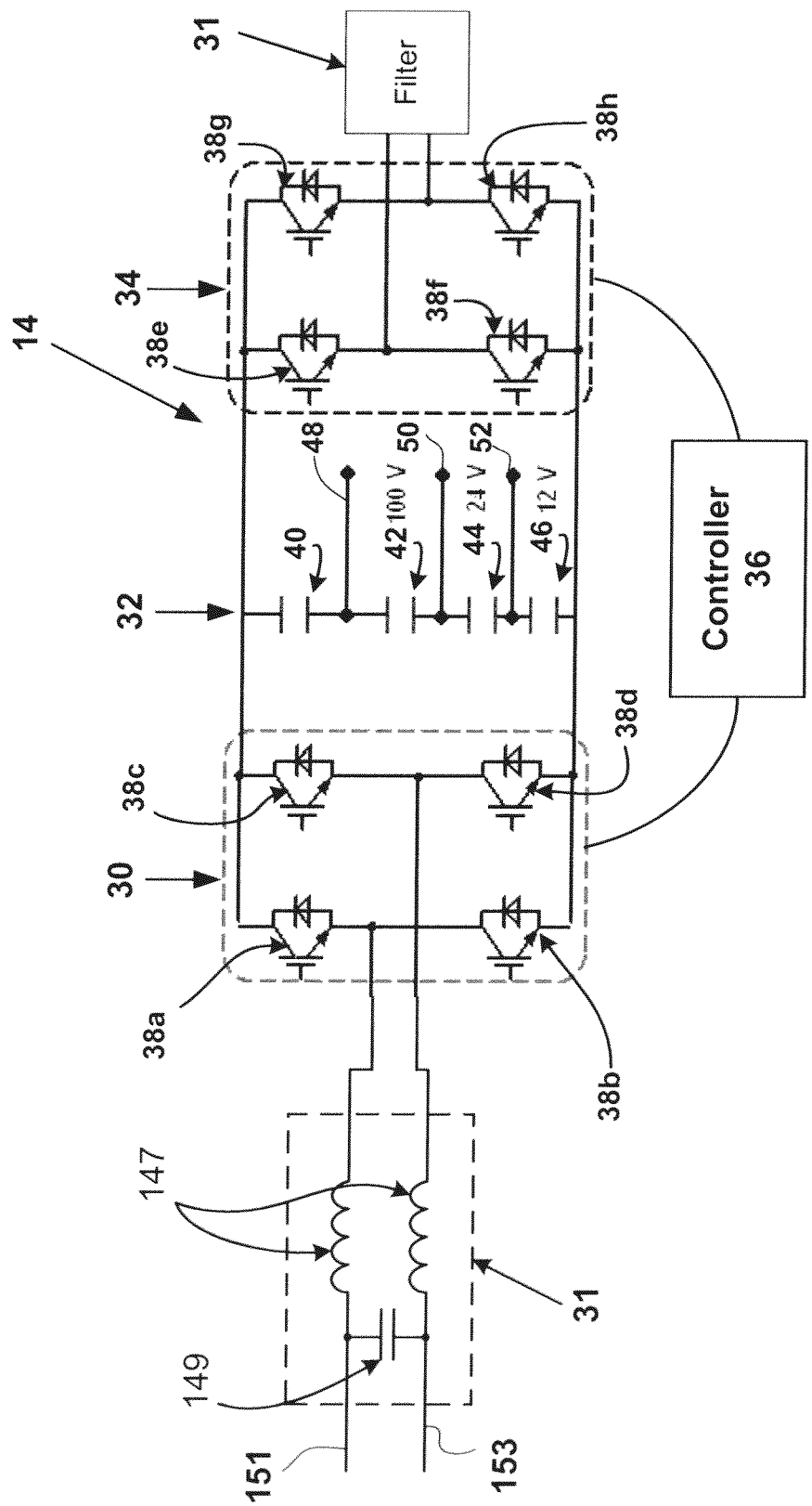
FIG. 3 shows a schematic circuit of a first AC-AC converter used in the first hybrid transformer.

The AC-AC converter 14 may be an AC-DC-AC converter having the structure shown in FIG. 3. In this embodiment, the AC-AC converter 14 includes a first switching bridge 30 connected by a DC link or bridge 32 to a second switching bridge 34. The first switching bridge 30 is connected to the ends of the secondary winding 26. A filter 31 may be connected between the first switching bridge 30 and the secondary winding 26. Another filter 31 may also be connected to an output of the second switching bridge 34. Each of the first and second switching bridges 30, 34 is connected to and controlled by a controller 36. In addition, each of the first and second switching bridges 30, 34 comprises a plurality of switching devices 38. As shown in FIG. 3, each of the first and second switching bridges 30, 34 may comprise a pair of arms connected in parallel, with each arm having a pair switching devices 38 connected in series. Each switching device 38 may be an insulated gate bipolar transistor (IGBT) and an anti-parallel diode. The DC bridge 32 may comprise a plurality of capacitors connected in series. The capacitors may have the same or different capacitances. As shown in FIG. 3, the DC bridge 32 may have four capacitors 40, 42, 44, 46. A plurality of DC taps are connected to the DC bridge 32 and provide different maintained DC voltage levels. More specifically, three DC taps 48, 50, 52 may be connected between pairs of the capacitors 40, 42, 44, 46, respectively, and may have maintained voltages of 12 Volts, 24 Volts and 100 Volts. Combinations of these taps 48, 50, 52 can be used to obtain 36, 112, 123 and 136 Volts DC. Other voltage levels can be implemented as well.

Figure 4:
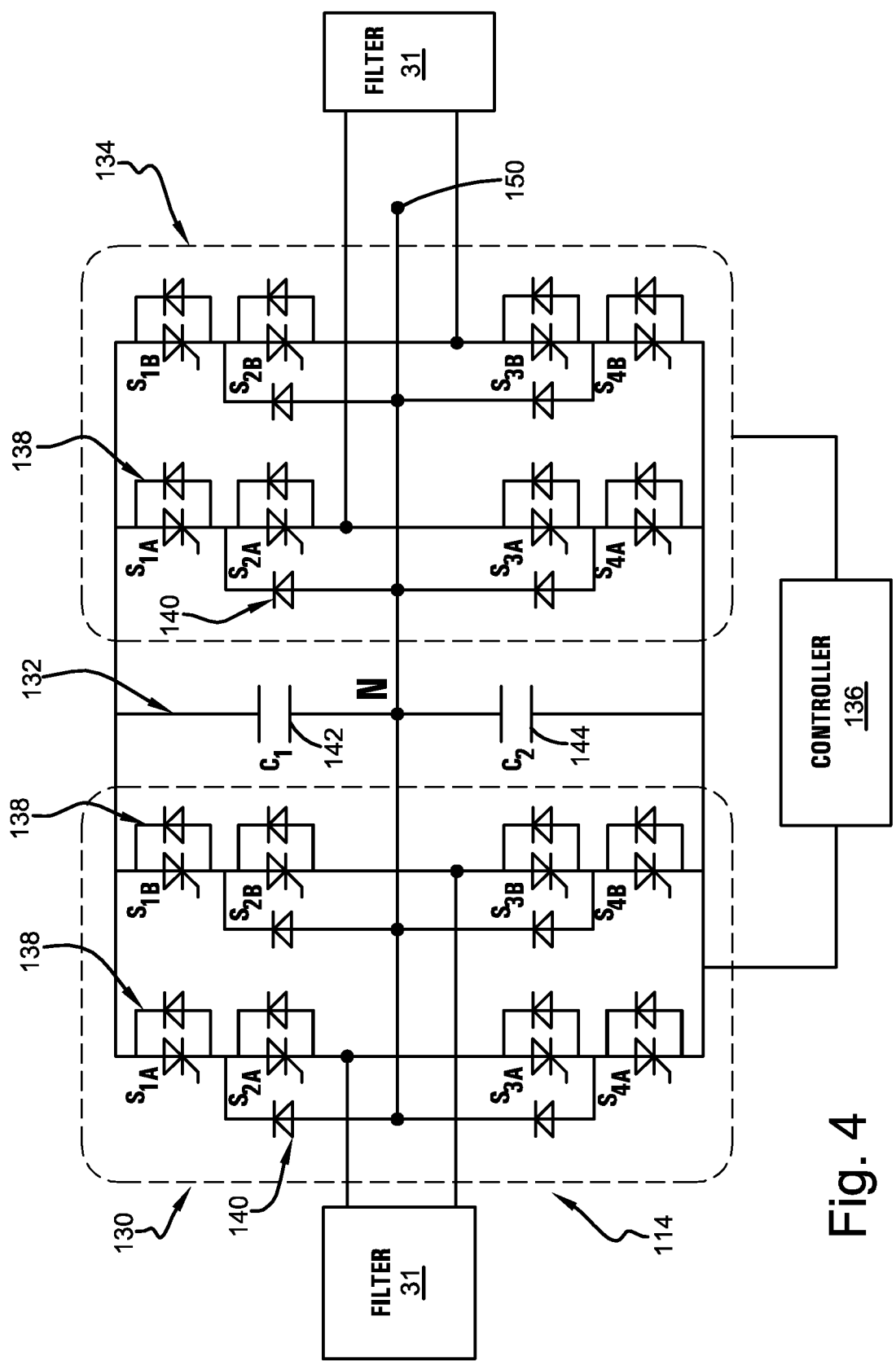
FIG. 4 shows a schematic circuit of a second AC-AC converter used in the second hybrid transformer.

The AC-AC converter 114 may be an AC-DC-AC converter having the structure shown in FIG. 4. In this embodiment, the AC-AC converter 114 is a neutral point converter (NPC) having three levels. The AC-AC converter 114 includes a first switching bridge 130 connected by a DC link or bridge 132 to a second switching bridge 134. The first switching bridge 130 is connected to the voltage source. A filter 31 may be connected between the first switching bridge 130 and the voltage source. Another filter 31 may be connected between the second switching bridge 134 and the primary winding 108. Each of the first and second switching bridges 130, 134 is connected to and controlled by a controller 136. In addition, each of the first and second switching bridges 30, 34 comprises a plurality of switching devices 138. As shown in FIG. 4, each of the first and second switching bridges 130, 134 may comprise a pair of arms connected in parallel, with each arm having four switching devices 138 connected in series. In each arm, a clamping diode 140 is connected between a top pair of the switching devices 138 and a bottom pair of the switching devices 138. Each switching device 138 may be an insulated gate bipolar transistor (IGBT) and an anti-parallel diode. The DC bridge 132 may comprise a plurality of capacitors connected in series. As shown in FIG. 4, the DC bridge 132 may have two capacitors 142, 144. The clamping diodes 140 are connected (clamped) to the DC bridge 132, between the capacitors 142, 144, i.e., at the middle or neutral point, where the voltage is half of the voltage across the entire DC bridge 132. A tap 150 may be connected to the neutral point as well.

As shown in FIG. 3, each filter 31 comprises inductors 147 connected into lines 151, 153, respectively. A capacitor 149 is connected in parallel between the lines 151, 153. The filters 31 help prevent high frequency harmonics from being introduced into the output voltage of the transformer 10,100 and the currents in the primary and secondary windings as a result of the switching of the switching devices 38, 138. Although the filters 31 are shown as being an LC filter, it should be appreciated that other types of filters may be used. For example, an L or an LCL filter may be used.

Although the AC-AC converters 14, 114 are shown having different constructions or topologies, it should be appreciated that they may both have the same topology, which may be the topology described above for the AC-AC converter 14, or the topology described above for the AC-AC converter 114. It should further be appreciated that other AC-AC converter topologies may be utilized for both of the AC-AC converters 14, 114, provided the other topologies have a DC link or bridge. For example, NPC AC-AC converters may be used having four, five, etc. levels. For those applications that do not require DC outputs, an AC-AC converter without a DC bridge can be used.

Figure 5:
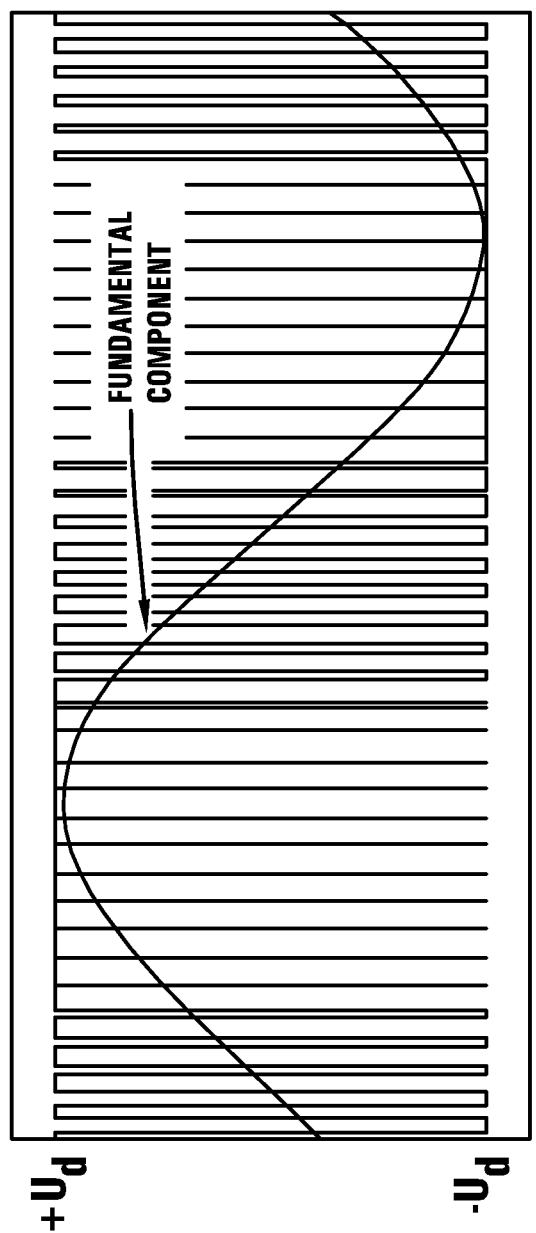
FIG. 5 shows a schematic of a sinusoidal waveform formed by pulse width modulation.

The controllers 36 and 136 each include a processor for executing a program stored in associated memory. The controllers 36 and 136 control the AC-AC converters 14, 114, respectively, using pulse width modulation (PWM), wherein the switching devices 38, 138 are opened and closed to create a series of voltage pulses, wherein the average voltage is the peak voltage times the duty cycle, i.e., the "on" and "off" times of pulses. In this manner, a sine wave can be approximated using a series of variable-width positive and negative voltage pulses as shown in FIG. 5. The phase and the amplitude of the sine wave can be changed by changing the PWM pattern.

Figure 6:
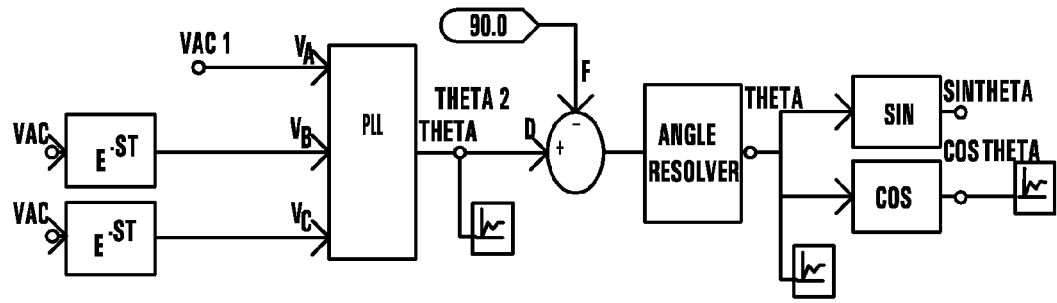
FIG. 6 shows a functional block diagram of a phase lock loop.

In each of the AC-AC converters 14, 114, the controller 36, 136 controls the first switching bridge 30, 130 to balance the real power transferring from the AC-AC converter 14, 114 and to control the primary side power factor by providing reactive power to the load through the transformer coupling. The controller 36, 136 controls the first switching bridge 30, 130 based on the d-q transformation, which is a transformation of coordinates from the three-phase stationary coordinate system to a dq rotating coordinate system. This transformation is typically made in two steps: 1) a transformation from the three-phase stationary coordinate system to the two-phase, so-called ab, stationary coordinate system and 2) a transformation from the ab stationary coordinate system to the dq rotating coordinate system. A phase lock loop, such as shown in FIG. 6, may be used to extract the phase angle of the primary side voltage. The d-q transform for a single phase converter is similar to that for a three-phase system. However, because there is only one phase variable, the corresponding imaginary variable which is 90 degree lagging the real signal has to be hypothesized.

Real signal $X_R = X_M \cos(\omega t + \phi)$

Imaginary variable: $X_I = X_M \sin(\omega t + \phi)$

Applying a rotating transformation matrix T to the stationary real and imaginary variables:

$$T = \begin{bmatrix} \cos(\omega t) & \sin(\omega t) \\ -\sin(\omega t) & \cos(\omega t) \end{bmatrix}$$

The variables in D-Q rotating coordinates become:

$$\begin{bmatrix} X_D \\ X_q \end{bmatrix} = T \begin{bmatrix} X_R \\ X_I \end{bmatrix} = X_M \begin{bmatrix} \cos(\phi) \\ \sin(\phi) \end{bmatrix}$$

The inverse transformation matrix from the dq rotating coordinates to the stationary real and imaginary variables is:

$$T^{-1} = T^T = \begin{bmatrix} \cos(\omega t) & -\sin(\omega t) \\ \sin(\omega t) & \cos(\omega t) \end{bmatrix}$$

Figure 7:
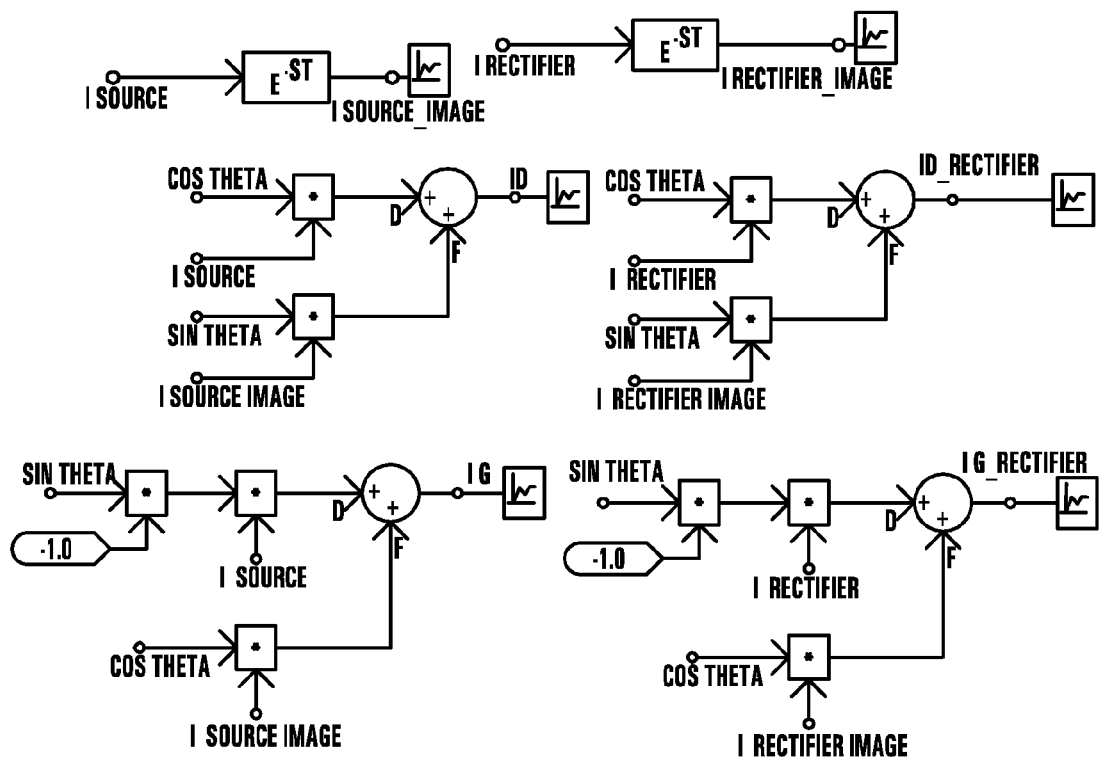
FIG. 7 shows functional block diagrams for the current a (and a imaginary)-dq transformation.

Functional block diagrams for the current a (and a imaginary)-dq transformation is shown in FIG. 7. In FIGS. 7 and 8, the term "rectifier" refers to the DC bridge 32, 132. The controller 36, 136 controls the voltage across the DC bridge 32, 132 to follow a reference DC voltage to balance the real power. The reference DC voltage is selected so that the AC-AC converter can compensate for up to a predetermined amount of voltage swell and sag, such as a voltage swell of up to 15% of the normal input voltage and a voltage sag of up to 35% of the normal input voltage. In the first example embodiment of the hybrid transformer 10, the reference DC voltage is 0.5 kV, whereas in the first example embodiment of the hybrid transformer 100, the reference DC voltage is 4.5 kV. In addition, the controller 36, 136 controls the q-axis component of the primary side current to be zero, which means unity power factor of the input to the hybrid transformer 10, 100. Functional block diagrams for the d-q vector control is shown in FIG. 8. First in the d-axis loop, the DC link (DC bridge 32, 132) voltage is compared with the reference DC voltage and the difference is fed to a proportional integral (PI) regulator, which generates Id_ref. The Id of the rectifier (DC bridge 32, 132) is then compared with Id_ref and the difference is fed to another PI regulator to generate the Vd_ref. In the q-axis loop, the Iq of the source current is compared to 0 and the difference is fed to a PI regulator, which generates the Iq_ref for the rectifier in the secondary side. Then, Iq_rectifier is compared with Iq_ref and the difference is fed to another PI regulator to generate the Vq_ref. The d-q voltages, Vdref and Vqref, are transformed to A and a-imaginary axis to generate the modulation signal for sinusoidal PWM (SWPM). Then gating signals are sent to the switching devices of the first switching bridge 30, 130. Functional block diagrams for the D-Q to a (a imaginary) transformation are shown in FIG. 9. Functional block diagrams for the generation of the gating signals for the AC-AC converter 14 are shown in FIG. 10 and functional block diagrams for the gating signals for the AC-AC converter 114 are shown in FIG. 11.

In each of the AC-AC converters 14, 114, the controller 36, 136 controls the second switching bridge 34, 134 to maintain the output voltage at a set value or reference output voltage (such as 480V/sqrt(3) RMS) and to be a clean sinusoidal waveform. Thus, in the event of a voltage sag, the controller 36, 136 increases the voltage output of the AC-AC converter 14, 114 and in the event of a voltage swell, the controller decreases the voltage output of the AC-AC converter 14, 114. In order to fully utilize the secondary winding 24 and avoid circulation current, the controller 36 controls the output voltage of the AC-AC converter 14 to be in phase with the voltage of the secondary winding 24. Similarly, in order to fully utilize the input voltage and avoid circulation current, the controller 136 controls the output voltage of the AC-AC converter 114 to be in phase with the voltage of the primary winding 106.

Figure 12:
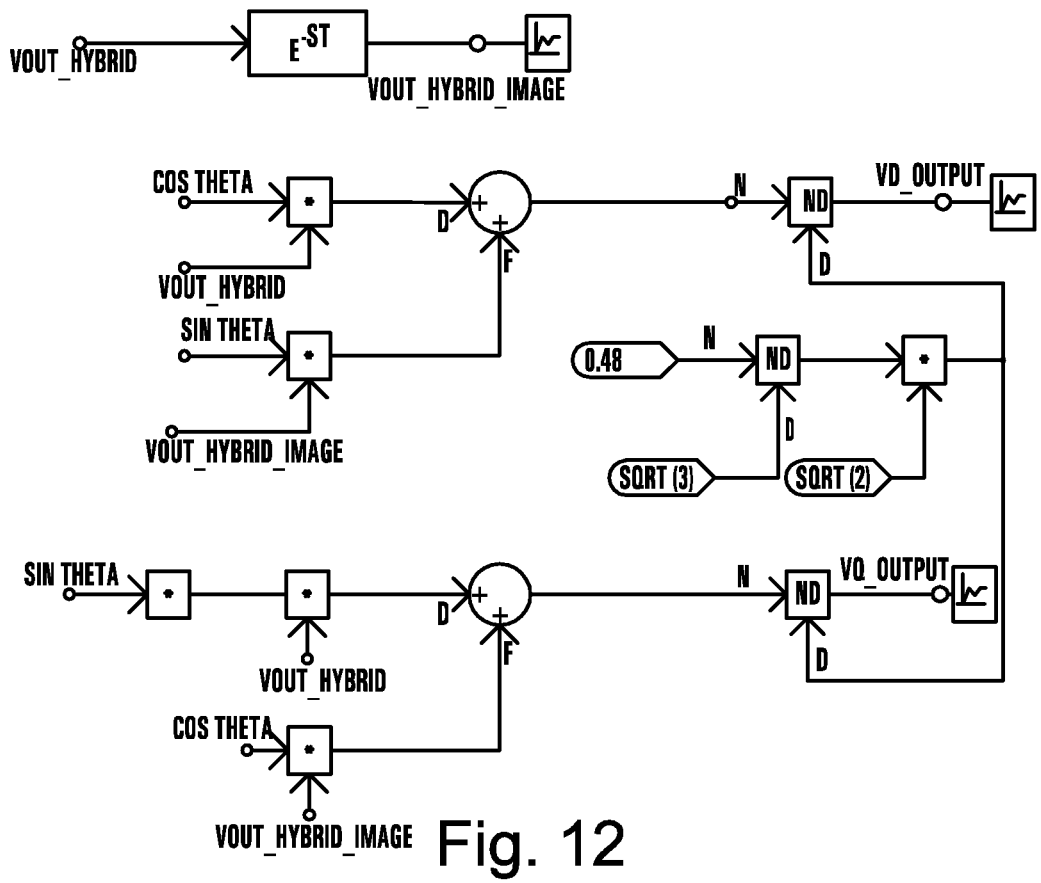
FIG. 12 shows functional block diagrams for output voltage a-dq transformation.
Figure 13:
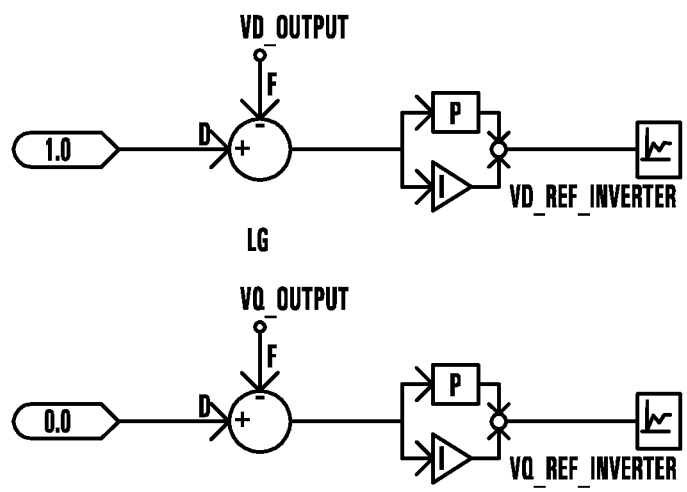
FIG. 13 shows functional block diagrams for d-q voltage control.
Figure 14:
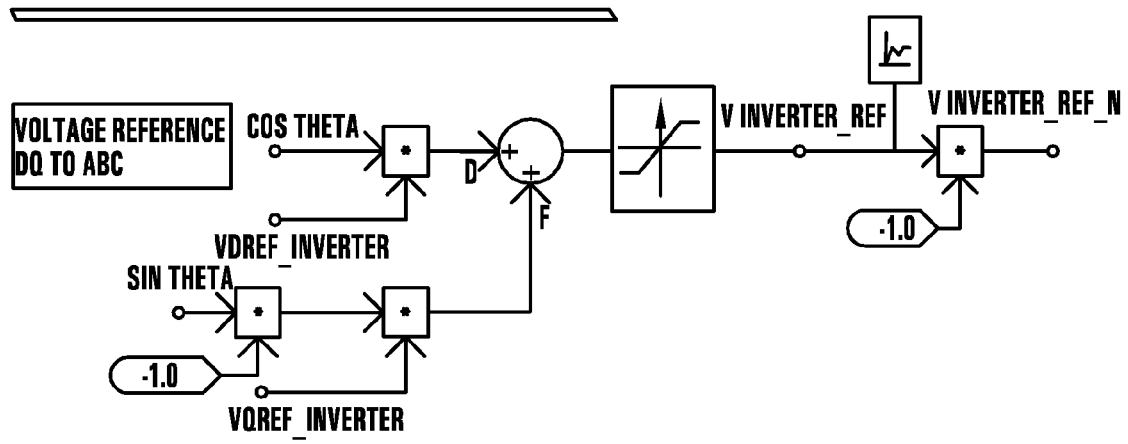
FIG. 14 shows a functional block diagram for d-q reference voltage to abc axis.
Figure 15:
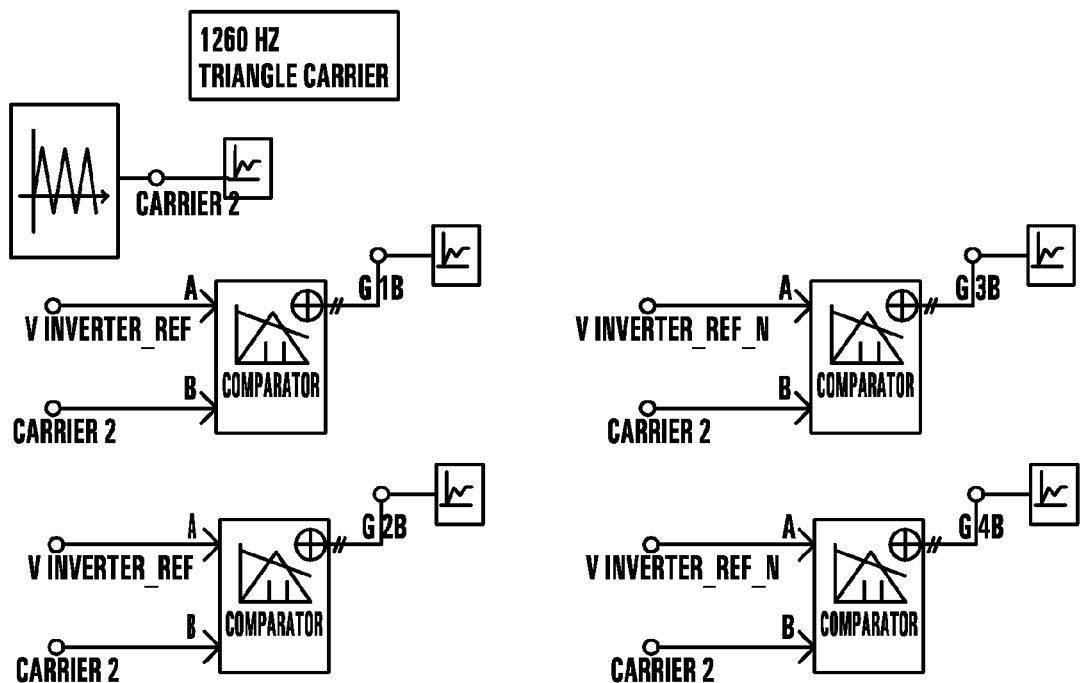
FIG. 15 shows SPWM modulation for the first AC-AC
Figure 16:
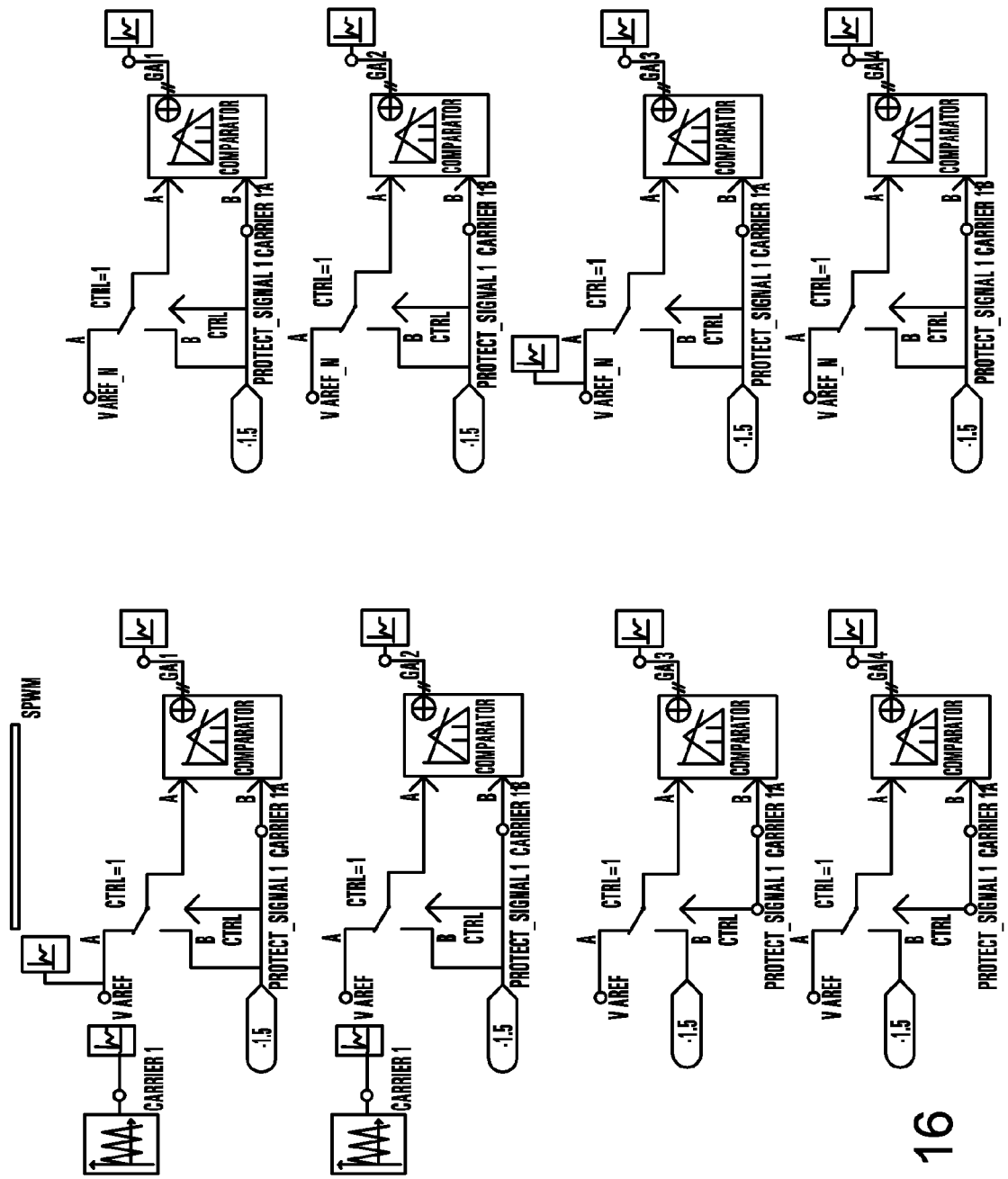
FIG. 16 shows SPWM modulation for the second AC-AC converter.

The controller 36, 136 also controls the second switching bridge 34, 134 based on the d-q transformation. First, the output voltage of the hybrid transformer 10, 100 is transformed from abc (a and a imaginary axis) to d-q axis, using the phase angle from the phase lock loop for the primary side voltage. Functional block diagrams for the output voltage a-dq transformation are shown in FIG. 12. The output d-q voltages are then compared with the reference output d-q voltages, respectively, and the differences are fed to PI regulators, respectively, to generate the d-q voltage references for the AC-AC converter. The goal of the controller 36, 136 is to regulate the transformer output voltage to be 1.0 pu. Therefore, the vector magnitude is compared with 1.0 pu, i.e., Vd_ref is set to be 1.0 pu, which means the output voltage of the hybrid transformer 10, 100 is regulated to be 480V/sqrt(3) RMS. Vq_ref is set to 0, so that for the AC-AC converter 14, the output voltage of the AC-AC converter 14 is in phase with the primary side voltage and the secondary winding 24, and so that for the AC-AC converter 114, the output voltage of the AC-AC converter 114 is in phase with the source voltage and the primary winding 106. Functional block diagrams for the d-q voltage control are shown in FIG. 13. The d-q voltage references are transformed to a (and a imaginary) axis, which is then used for the modulation signal for the SPWM control. A functional block diagram for the d-q reference voltage to abc axis is shown in FIG. 14. The SPWM modulation for the AC-AC converter 14 is shown in FIG. 15 and the SPWM modulation for the AC-AC converter 114 is shown in FIG. 16.

In the hybrid transformers 10, 100, the AC-AC converters 14, 114 are protected from short circuit faults.

In the hybrid transformer 10, the controller 36 monitors the input voltage and the output current of the hybrid transformer 10. If the output current exceeds a predetermined limit, thereby indicating a short circuit fault in the output, or the input voltage drops below a certain level, thereby indicating a short circuit fault in the input, the controller 36 stops the pulse width modulation of all of the switching devices 38, i.e., turns off (opens) the switching devices 38, thereby disconnecting the load from the source. In this manner, the AC-AC converter 14 acts as a circuit breaker.

In the hybrid transformer 100, it is possible that the AC-AC converter 114 may be subject to the entire voltage in the event of a short circuit fault. In order to protect the AC-AC converter 114 from this increased voltage, the controller 136 monitors the voltage of the AC-AC converter 114. If the voltage increases above a predetermined level, thereby indicating a fault, the controller 136 turns on (closes) the top four switching devices 38 designated S1a, S1b, S2a, S2b (or the bottom four switching devices designated S3a, S3b, S4a, S4b) in the first switching bridge 130, thereby causing the AC-AC converter 114 to be bypassed. In order to provide additional protection, a circuit breaker 170 may be connected between the source and the AC-AC converter 114. The circuit breaker 170 may be a solid state circuit breaker or an electro-mechanical circuit breaker. In lieu of the circuit breaker 170, a bypass switch 172 may be connected in parallel with the AC-AC converter 114, between the AC-AC converter 114 and the primary winding 106.

As described above, the hybrid transformers 10, 100 each have three windings. It should be appreciated that a hybrid transformer embodied in accordance with the present invention may have less than three windings, i.e., may have a single primary winding and single secondary winding. Hybrid transformers 54, 74 described below are two such examples.

Figure 17:
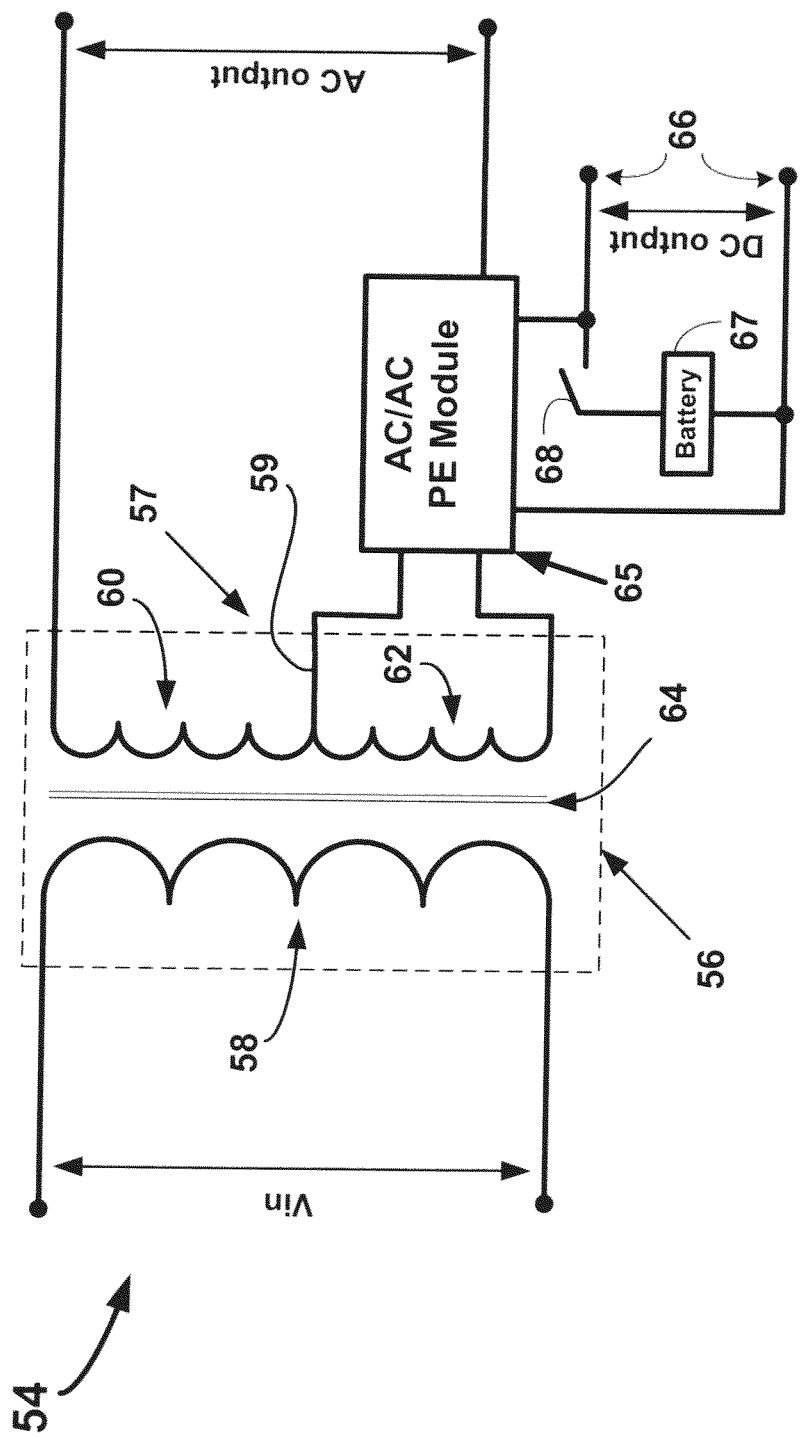
FIG. 17 shows a schematic circuit of a third hybrid transformer constructed in accordance with a third embodiment of the present invention.

Referring now to FIG. 17, the hybrid transformer 54 includes an electromagnetic transformer 56, which has a single primary winding 58 and a single secondary winding 57 with one or more taps. Each tap is connected to a turn of the secondary winding 57, between ends of the secondary winding 57. An inner tap 59 divides the secondary winding 57 into two winding portions 60 and 62. The winding portion 60 is formed by the inner tap 59 and a first extremity of the secondary winding 57 or, alternately, another, outer tap. Similarly, the winding portion 62 is formed by the inner tap 59 and a second extremity of the secondary winding 57 or, alternately, another, outer tap. The primary and secondary windings are wound around a ferromagnetic core 64. Power electronic module 65 is connected across the winding portion 62 of the secondary winding 57. The voltage "AC output" is equal to the voltage across the winding portion 60 of the secondary winding plus the voltage across the power electronic module 65. Since the output voltage equals the voltage output from the power electronic module 65 plus the voltage of the winding portion 60, control of the voltage output from the power electronic module 65 controls the output voltage of the hybrid transformer 54. As will be described below, power electronic module 65 comprises a DC bus that can be used to power DC loads when the load is connected to DC output terminals 66 of the hybrid transformer 54. An optional energy storage device, such as a battery 67, can be connected across the DC output terminals 66 using a switch 68.

Figure 18:
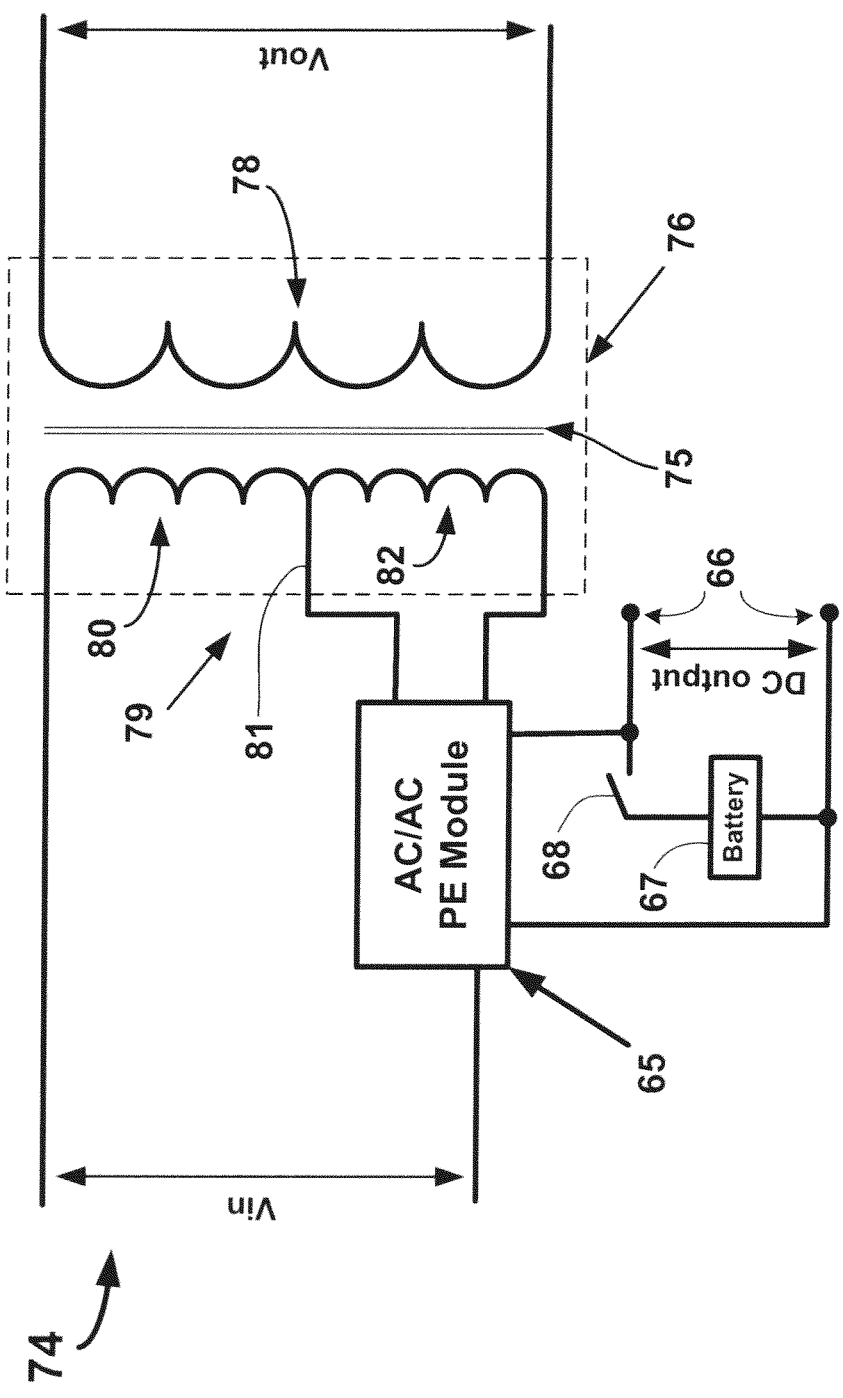
FIG. 18 shows a schematic circuit of a fourth hybrid transformer constructed in accordance with a fourth embodiment of the present invention.

Referring now to FIG. 18, hybrid transformer 74 includes an electromagnetic transformer 76, which has a single secondary winding 78 and a single primary winding 79 with one or more taps. Each tap is connected to a turn of the primary winding 79, between ends of the primary winding 79. An inner tap 81 divides the primary winding 79 into two winding portions 80 and 82. The winding portion 80 is formed by the inner tap 81 and a first extremity of the primary winding 79 or, alternately, another, outer tap. Similarly, the winding portion 82 is formed by the inner tap 81 and a second extremity of the primary winding 79 or, alternately, another, outer tap. The primary and secondary windings are wound around a ferromagnetic core 75. The power electronic module 65 is connected to the winding portion 82 of the primary winding 79. The voltage Vin is equal to the voltage across the winding portion 80 plus the voltage across the power electronic module 65. Since the input voltage equals the voltage output from the power electronic module 65 plus the voltage of the winding portion 80, control of the voltage output from power electronic module 65 controls the input voltage and, thus, the output voltage of the hybrid transformer 74.

Figure 19:
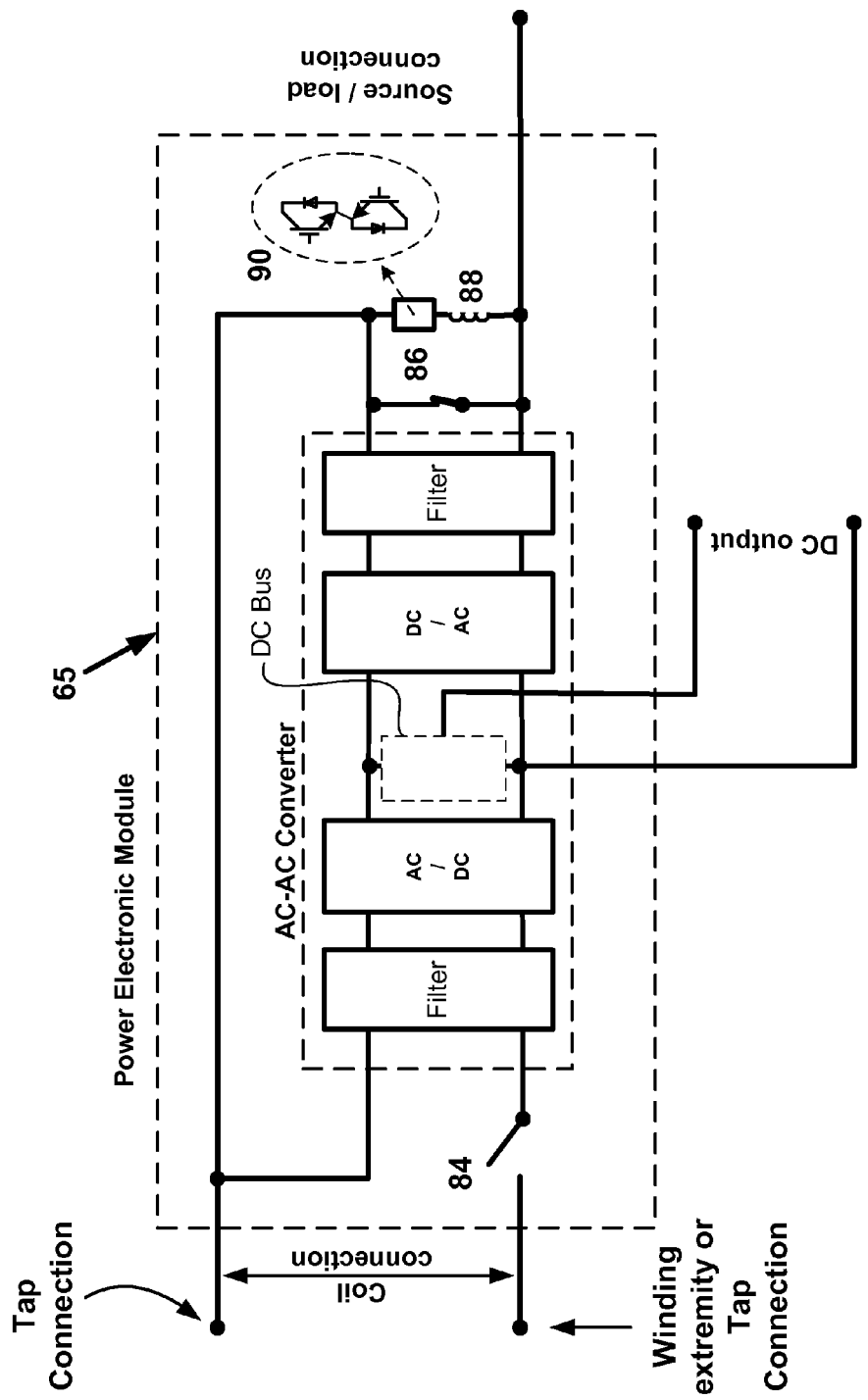
FIG. 19 shows a schematic circuit of a power electronic module used in the third and fourth hybrid transformers shown in FIG. 17 and FIG. 18.

Referring now to FIG. 19, the power electronic module 65 comprises an AC-AC converter, two switches 84 and 86 and a fault current limiting assembly that includes an impedance or inductor 88 and an electronic switch 90. As shown in FIG. 19, the inductor 88 is connected in series with the electronic switch 90. Each of the switches 84, 86 may be a mechanical switch, an electronic switch or a hybrid mechanical/electronic switch. The switches 84, 86 and the electronic switch 90 are controlled by the controller of the AC-AC converter. The AC-AC converter may be the AC-AC converter 14, the AC-AC converter 114, or an AC-AC converter having another, different type of topology. In the hybrid transformer 54, the power electronic module 65 may utilize the AC-AC converter 14, while in the hybrid transformer 74, the power electronic module 65 may utilize the AC-AC converter 114. If the power electronic module 65 utilizes the AC-AC converter 14, the DC bus of the power electronic module 65 comprises the DC bridge 32. If the power electronic module 65 utilizes the AC-AC converter 114, the DC bus of the power electronic module 65 comprises the DC bridge 132.

During normal operation of the power electronic module 65, the switch 84 is closed and the switch 86 is open. If the power electronic module 65 malfunctions, a bypass can be created by opening the switch 84 and closing the switch 86. During normal operation, the electronic switch 90 is open and load current flows through the DC-AC converter (second switching bridge 34 or 134) of the AC-AC converter. During a network phase-to-ground or phase-to-phase fault, the DC-AC converter is blocked and the switch 90 is closed, forcing the fault current to pass through the impedance 88. By introducing the impedance 88 during faults, the fault current is limited to protect the transformer and upstream equipment. Impedance 88 can be of resistive or inductive type.

It should be appreciated that the hybrid transformers 10, 100 may be provided with the switches 84, 86 and the impedance 88 and the electronic switch 90 in the same arrangement (relative to the AC-AC converter 14, 114) and operating in the same manner as described above for the hybrid transformers 54, 74.

Figure 20:
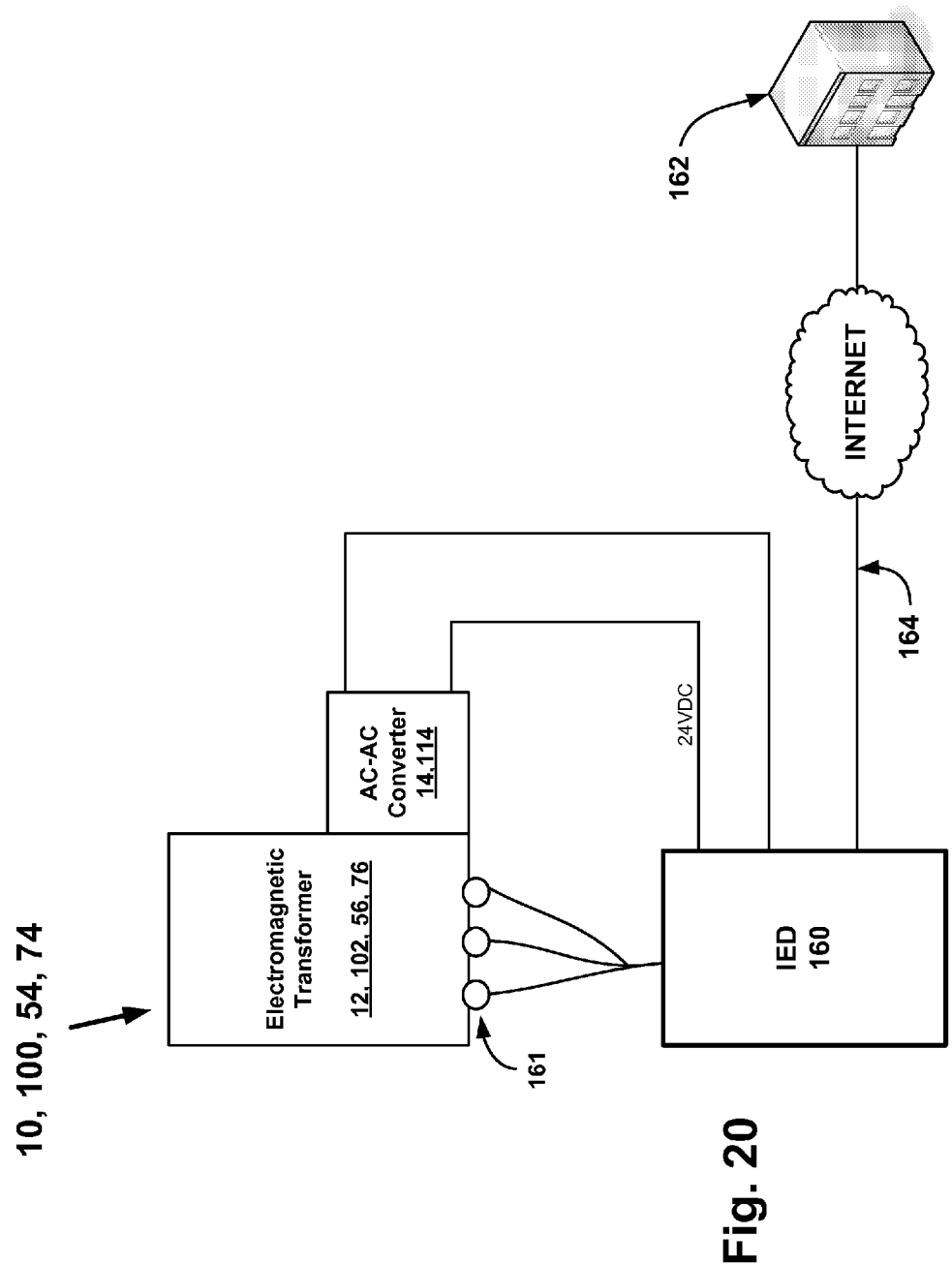
FIG. 20 shows a schematic circuit of a hybrid transformer with an IED and a communication link.

In each of the hybrid transformers 10, 100, 54, 74, the controller 36, 136 may be an intelligent electronic device (IED) or may interface with an IED, wherein the IED controls and monitors operational aspects of the hybrid transformer 10, 100, 54, 74 in addition to controlling the AC-AC converter 14, 114. Such an IED 160 is shown in FIG. 20 mounted on or proximate to the hybrid transformer 10, 100, 54, 74. The IED 160 includes a user interface, a processor, memory and a communication port. In addition to controlling the AC-AC converter 14, 114 and the devices appurtenant thereto, the IED 160 monitors the operation of the hybrid transformer 10, 100, 54, 74 and communicates operating information to a remotely located control center 162 over a communication link 164, which may be may be a physical hardwired link, a satellite link, a cellular link, a modem or telephone line link, an Internet link or any other wireless or wide area or shared local area network link. For example, the currents, voltages and temperatures of the primary and/or secondary windings may be measured by sensors 161 that are connected for communication with the IED 160. The IED 160 may periodically or continuously transmit values for these currents, voltages and temperatures over the communication link 164 to the control center 162 and/or may transmit alarms to the control center 162 over the communication link 164 if the values exceed certain predetermined limits. In addition to transmitting information about the primary and/or secondary windings, the IED 160 may transmit information about the operation of the AC-AC converter 14,114 to the control center 162 over the communication link 164. Moreover, the IED 160 may receive and implement control commands from the control center 162 for changing the operation of the AC-AC converter 14, 114.

In addition to communicating with the control center 16, the IED 160 may communicate with other IEDs. For example, the IED 160 may communicate with other IEDs 160 installed in other hybrid transformers 10, 100, 54, 74 that are part of the same power distribution network. The IEDs 160 may communicate directly with each other or through a data server (not shown) located in the control center 162. In the former case, the IEDs 160 may communicate directly with each other via radio frequency transceivers, a wired or wireless local area network (LAN) or a communication bus. In the latter case, communication between each IED 160 and the data server occurs over the communication link 164.

The IED 160 may support the IEC61850 standard and, in so doing, define abstract object models for electrical substations and a method for accessing these models over a network. The models can be mapped to a number of protocols, including Manufacturing Message Specification (MMS), Generic Object Oriented Substation Events (GOOSE), Generic Substation Status Event (GSSE), and Sampled Measured Values (SMV). These protocols can run over TCP/IP networks and/or LANs using high speed switched Ethernet.

Instead of using an IED to transmit operating information to a remotely located control center, transmitters may be used to do so. The transmitters may be connected to the sensors 161 and may transmit the values measured by the sensors to a remote location, such as the control center 162, via a communication link, which may be wireless, or hardwired.

The DC taps 48, 50, 52, 150 may be connected to provide DC power to the sensors 161, transmitters and other communication devices that are used to monitor and transmit data concerning the operation of the hybrid transformer 10, 100, 54, 74. The DC taps 48, 50, 52, 150 may also be connected to provide DC power to the controller 36, 136 and/or IED 160. Depending on the application of the hybrid transformer 10, 100, 54, 74, the DC taps may be connected to provide DC power to equipment associated with the application.

Figure 21:
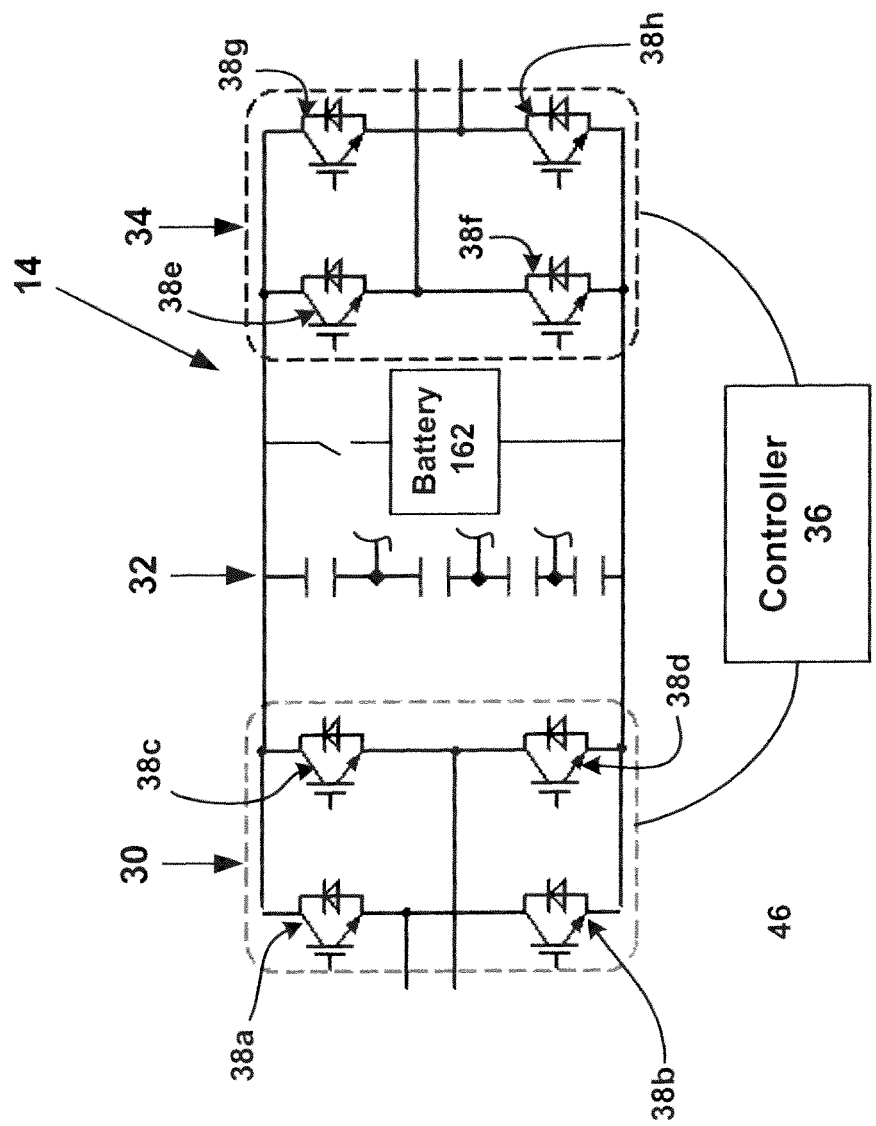
FIG. 21 shows a schematic circuit of the first AC-AC converter with a battery bank.

In each of the AC-AC converters 14, 114 a battery bank 162 and associated switch may be connected in parallel with the DC bridge 32, 132, as shown in FIG. 21 for the AC-AC converter 14. When the IED 160 detects a voltage sag or interruption, the IED 160 may close the switch and connect the battery bank 162 to the second switching bridge 34 so as to provide DC power to the second switching bridge 34 to compensate for the loss or sag. A trickle charger or float charger connected to the DC bridge 32 may keep the battery bank 162 fully charged when the battery bank is not being utilized. In lieu of having the battery bank 162 connected in parallel with the DC bridge 32, 132, the battery bank 162 may be connected into the DC bridge 32, 132 and may replace the capacitors. Still another option is to connect a battery bank 67 across the DC output terminals of the hybrid transformer 10, 100, 54, 74, such as is shown in FIGS. 17, 18.

Three of the single-phase hybrid transformers 10, 100, 54, 74 can be connected to form a three-phase transformer. The connection can be Y-Y, Y-Δ, Δ-Y, or Δ-Δ. In this embodiment, the controllers 36, 136 for the hybrid transformers 10, 100, 54, 74 would be synchronized to provide balanced three-phase power.

Figure 22:
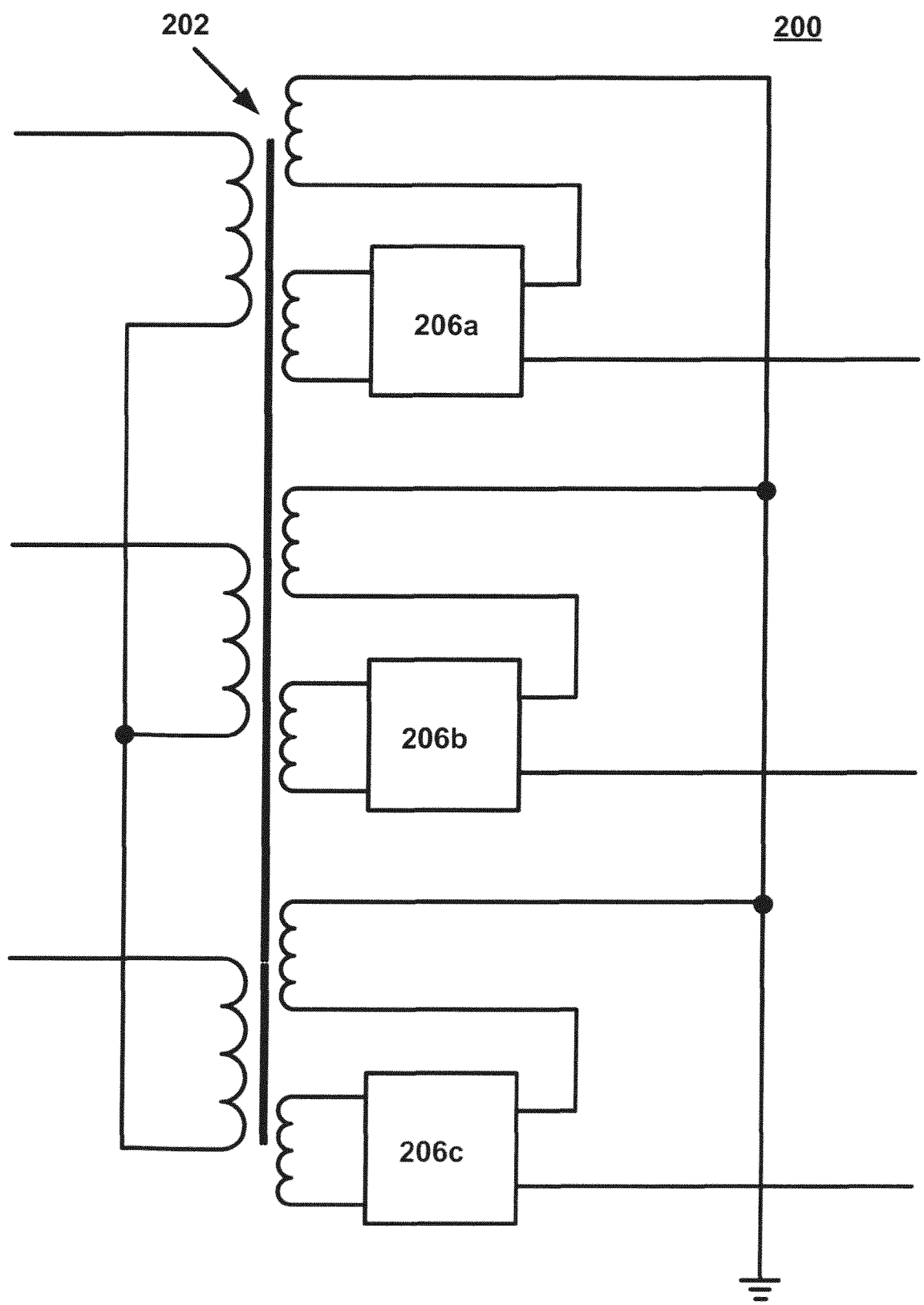
FIG. 22 shows a schematic circuit of a three-phase hybrid transformer constructed in accordance with the present invention.

Referring now to FIG. 22, a three-phase hybrid transformer 200 may be provided having a three-phase electromagnetic transformer 202 and a three-phase AC-AC converter. In the hybrid transformer 200, the same principles of voltage regulation and power factor correction remain the same as that described above for the single-phase hybrid transformer 10, 100, 54, 74. The AC-AC converter may be comprised of three units 206a, b, c, one for each phase, wherein each unit 206 has substantially the same construction as the AC-AC converter 14 or the AC-AC converter 114 except the controller for the three-phase hybrid transformer is adapted to control three-phase currents and voltages instead of single-phase currents and voltages.

It should be appreciated that multiphase hybrid transformers may be provided having more than three phases. For such multiphase hybrid transformers, the same principles of voltage regulation and power factor correction remain the same as that described above for the single-phase hybrid transformer 10, 100, 54, 74.

The hybrid transformer 10, 100, 54, 74 of the present invention provides a number of benefits. The AC-AC converter 14, 114 is operable to control the power factor on the primary side of the hybrid transformer 10,100. In contrast, the power factor on the primary side of a conventional transformer depends on the load. In addition, the AC-AC converter 14, 114 is operable to reduce fluctuation in the output voltage of the hybrid transformer 10, 100, 54, 74 in the event of a sag or a swell in the input voltage. For example, in the event of an increase or decrease of 15% in the input voltage, the AC-AC converter 14, 114 can keep the fluctuation in output voltage to less than 5%. The input current of the hybrid transformer 10, 100, 54, 74 is also smaller than that of a conventional transformer because the hybrid transformer 10, 100, 54, 74 generates all the needed reactive power and, thus, the voltage source only provides the real power to the load. The hybrid transformer 10, 100, 54, 74 may be used in datacenters, naval propulsion systems, automotive manufacturing facilities, pharmaceutical plants, hospitals, polymer processing plants, paper mills and wind farms.

An example of how a hybrid transformer embodied in accordance with the present invention can be used to more efficiently to replace a conventional power system is shown in FIGS. 23 to 27.

Figure 23:
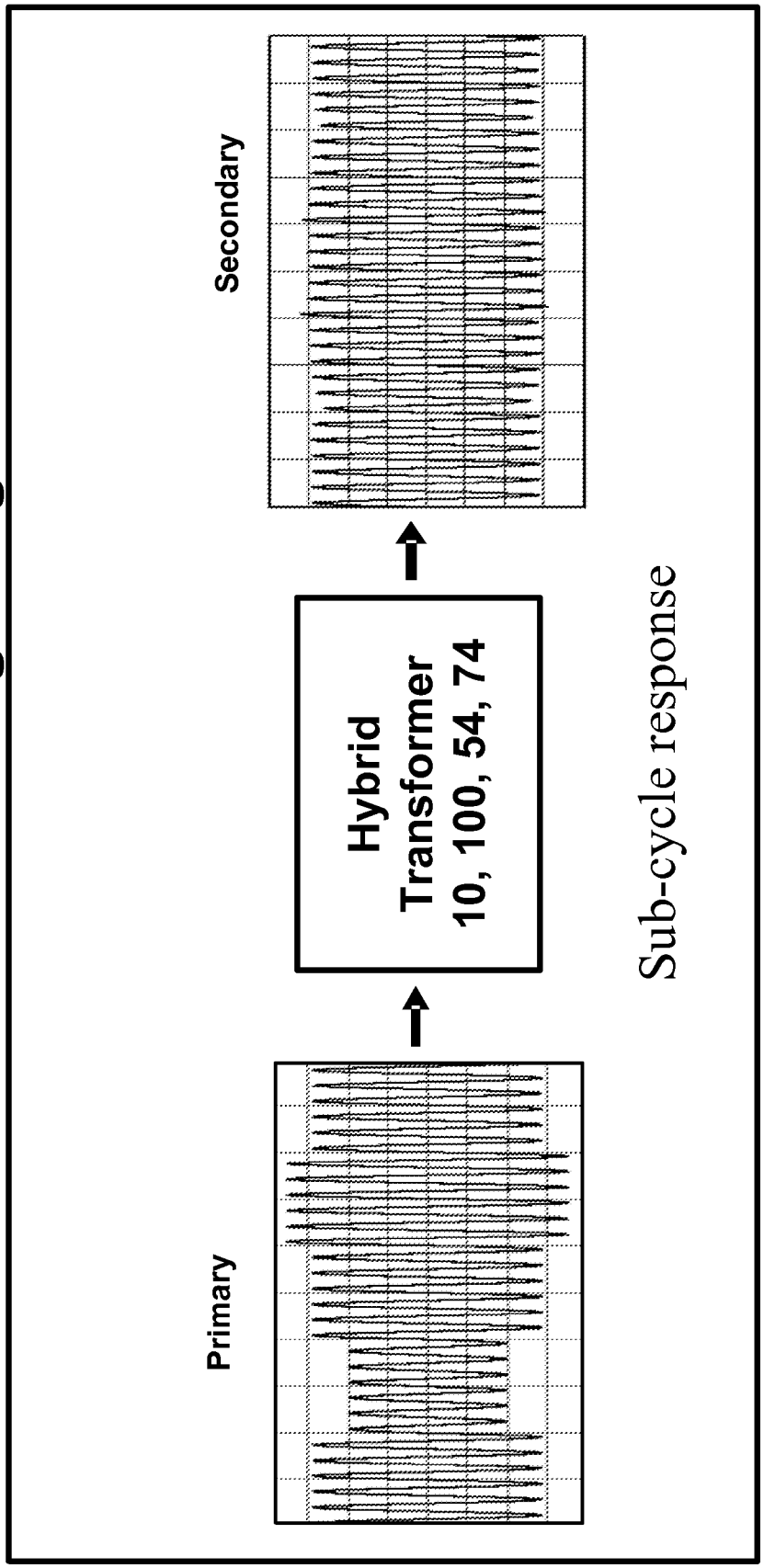
FIG. 23 shows a plot of the transient voltage regulation capability of a simulated hybrid transformer of the present invention.

Referring now to FIG. 23, there is shown a simulation result for transient voltage regulation. The primary voltage has ±20% fluctuations that are compensated by the hybrid transformer to obtain a regulated secondary voltage.

Figure 24:
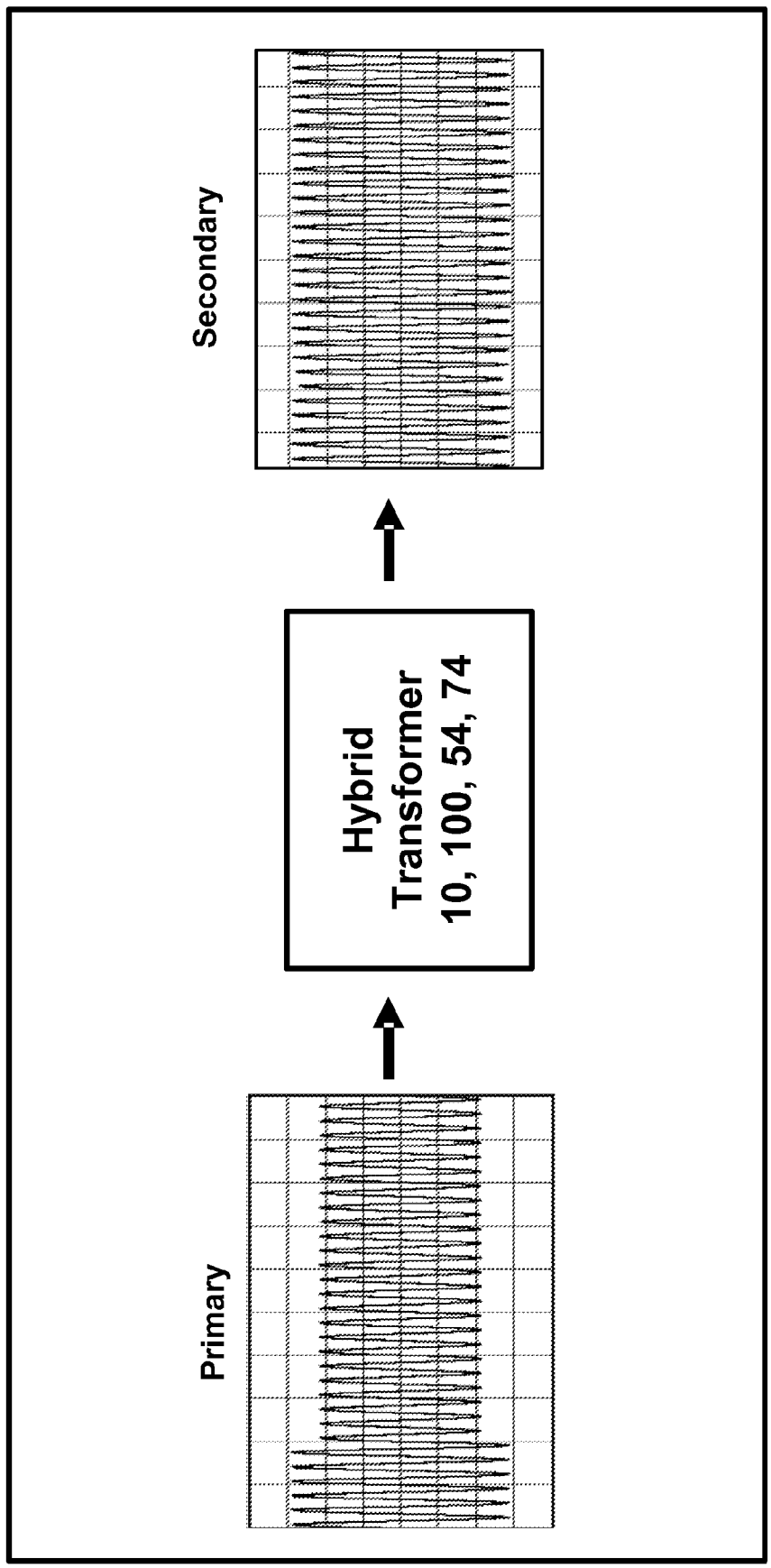
FIG. 24 shows a plot of the long time (sag) voltage regulation capability of a simulated hybrid transformer of the present invention.
Figure 25:
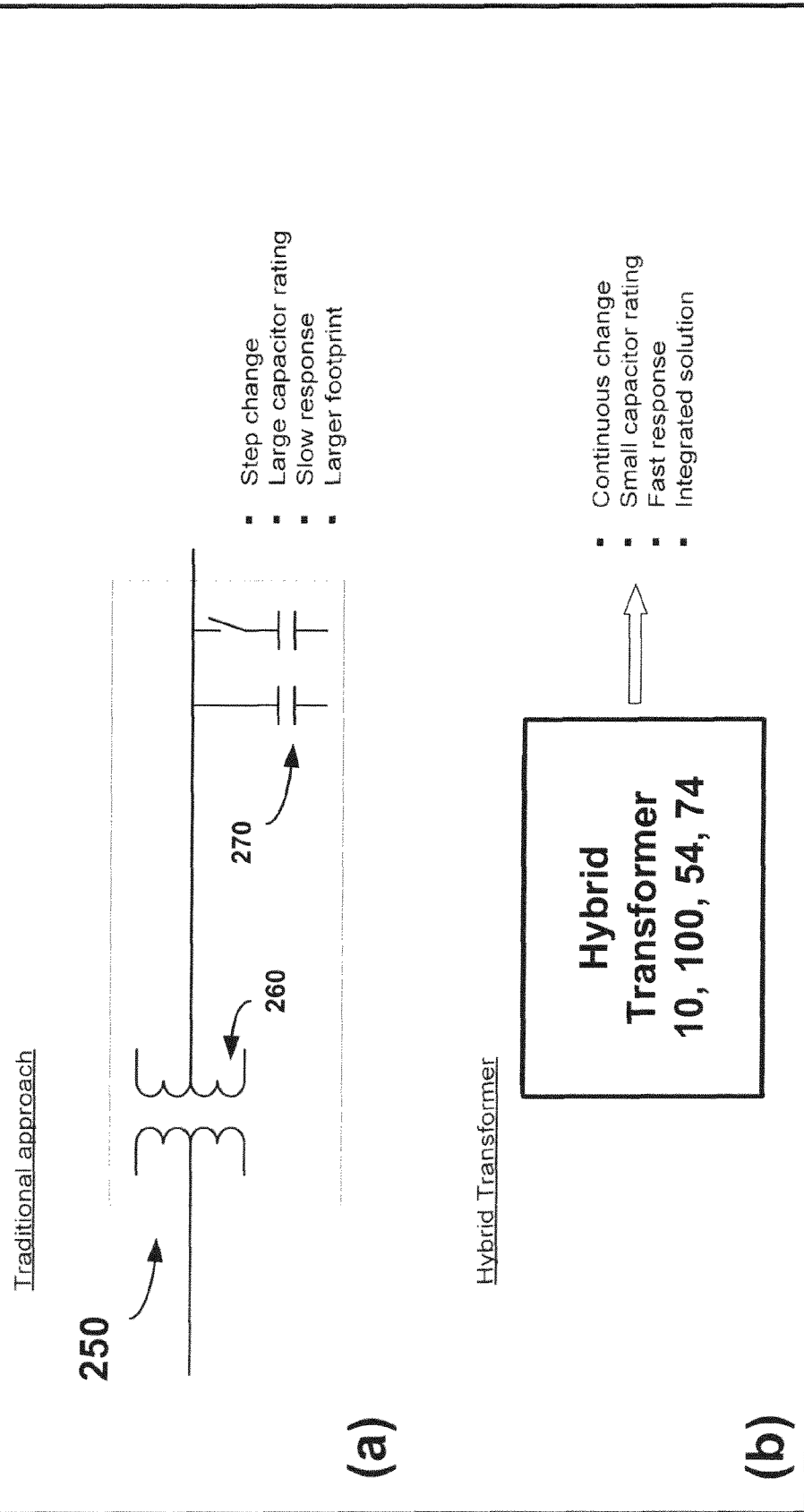
FIG. 25 shows an application of a hybrid transformer of the present invention for power factor correction.

Referring now to FIG. 24, there is shown a simulation result for a 20% long time voltage sag. The primary voltage depression is compensated by the hybrid transformer to obtain a regulated secondary voltage. In this case the hybrid transformer exhibits an on-load tap changer functionality.

In FIG. 25(a), a conventional power system 250 for power factor correction is shown. The power system 250 includes a conventional electromagnetic transformer 260, and a switchable capacitor bank 270. The capacitor bank 270 is switched by incremental steps to provide reactive power needed for load power factor correction. This method is characterized by a slow response and a large footprint. The hybrid transformer 10, 100, 54, 74 shown in FIG. 25(b) provides a continuous and fast change of reactive power output needed for power factor correction. It provides an integrated solution that requires less capacitor rating and a limited footprint.

Figure 26:
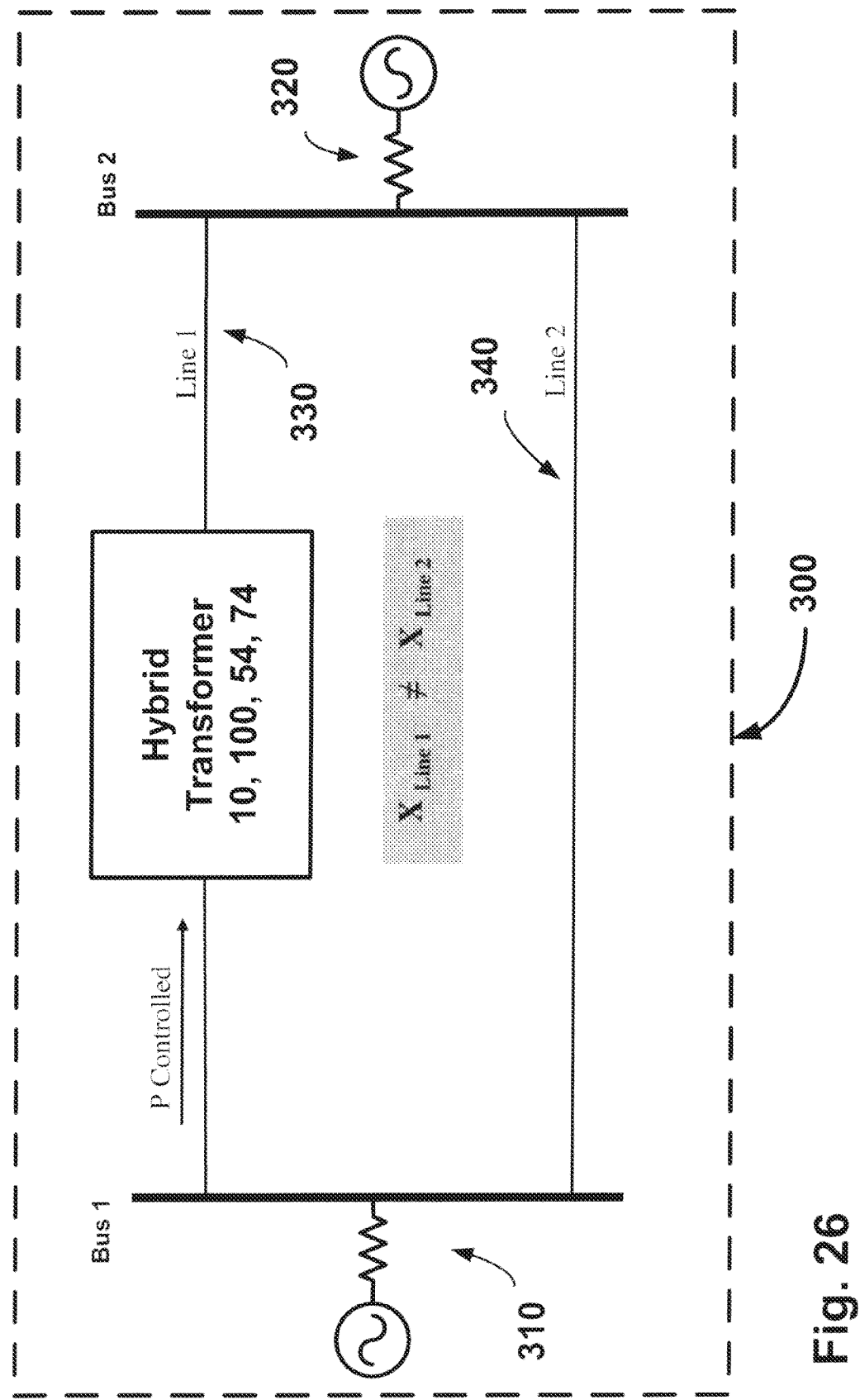
FIG. 26 shows an application of a hybrid transformer of the present invention for phase shifting and power-flow control on parallel lines.
Figure 27:
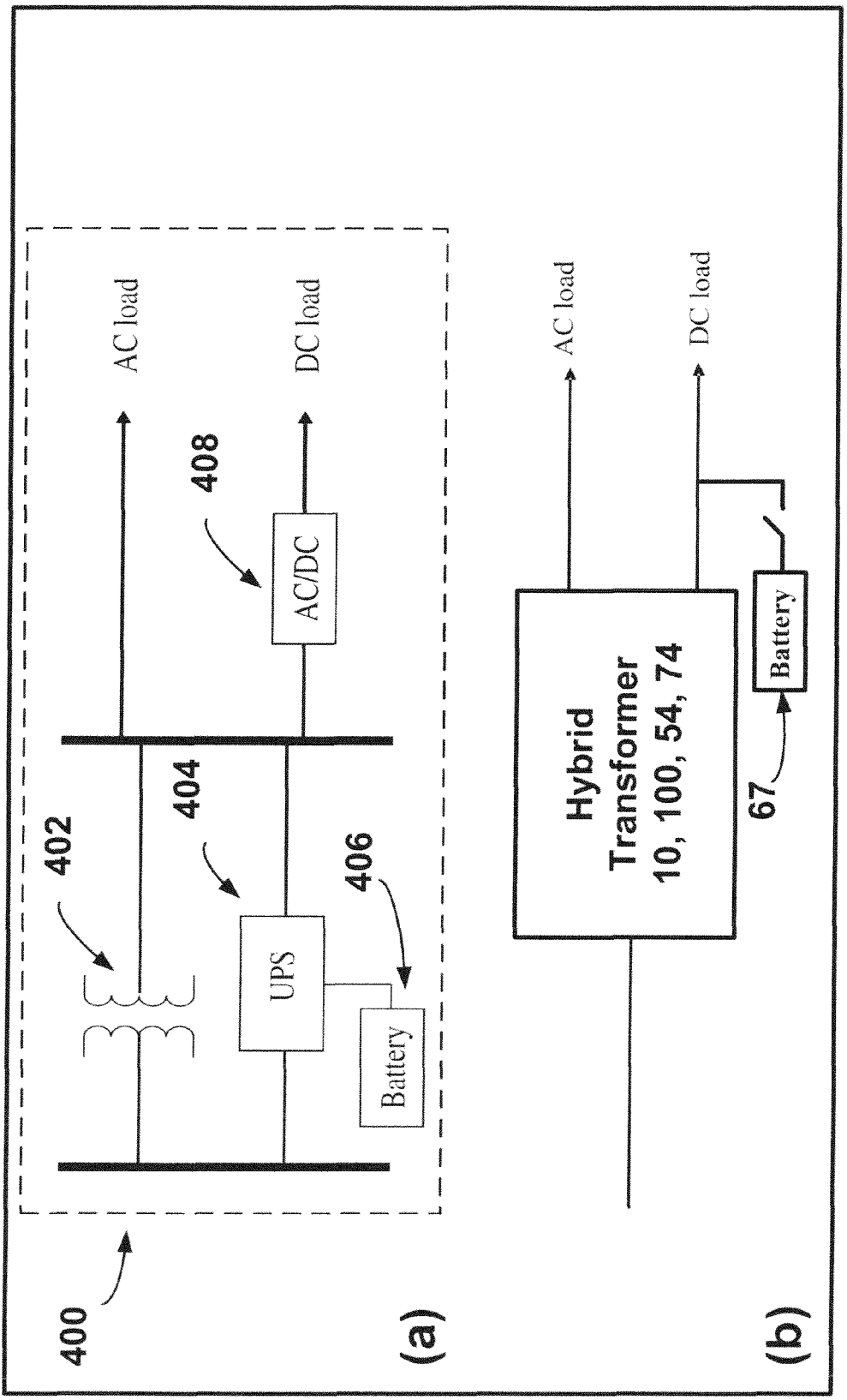
FIG. 27 shows an application of a hybrid transformer of the present invention for a datacenter where AC and DC loads are powered by the hybrid transformer.

In FIG. 26, a power system 300 connecting two networks 310 and 320 using two parallel lines 330 and 340. In practice, the parallel lines do not have the same impedance and the power flowing in one line is greater that that flowing in the other line. Under heavy load condition, one of the lines 330, 340 may be subjected to thermal overload, thereby causing line sags and mechanical stresses. When the hybrid transformer 10, 100, 54, 74 is placed in series with the line 330, it allows control of power flow through line 330 by imposing a phase shift on the output voltage. The hybrid transformer 10, 100, 54, 74 can be placed in series with both of the lines 330 and 340 and control the power flow on that corridor.

In FIG. 27(a), a conventional power system 400 for a data center is shown. The power system 400 includes a conventional electromagnetic transformer 402, a conventional uninterruptible power supply (UPS) 404, a battery bank 406 and a rectifier 408. The UPS 404 and the transformer 402 are connected to an AC voltage source and provide conditioned AC power to AC loads. The UPS 404 is connected to the battery bank 406 to provide AC power in the event of a failure of the voltage source. The rectifier 408 converts the conditioned AC power to DC power that is used to power DC loads, such as computers.

The conventional power system 400 can be replaced by an embodiment of the hybrid transformer 10,100, 54, 74 having the battery bank 67 connected across the DC output terminals of the hybrid transformer through the switch 68. As shown in FIG. 27(b), the DC loads are connected to the DC output terminals of the hybrid transformer 10, 100, 54, 74. Under normal conditions, the battery bank 67 is maintained at full charge, but the switch 68 is open. DC power is provided to the DC loads from the AC-AC converter 14,114. Upon the occurrence of a power outage, the switch 68 closes and DC power is supplied from the battery bank 67 to the DC loads until AC power is restored or a local generator unit is started.

The hybrid transformer 10, 100, 54, 74 with the battery bank 67 provides the same benefits as the conventional power system 400, but more efficiently and with less equipment.

As will be appreciated by one of skill in the art and as before mentioned, the present invention may be embodied as or take the form of the methods of controlling and monitoring hybrid transformers previously described, a computing device or system having program code configured to carry out the methods, a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows to achieve the previously described technical results. The program code may execute entirely on the user's computing device, partly on the user's computing device, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A hybrid transformer having a primary side for receiving an input voltage and a current from a source and a secondary side for providing an output voltage and a current to a load, the hybrid transformer comprising:
    a ferromagnetic core;
    a first winding, a second winding and a third winding wound around the core, wherein at least one of the first, second and third windings is a primary winding for connection to the source, and at least one of the first, second and third windings is a secondary winding for connection to the load; and,
    an AC-AC converter comprising:
        a first switching bridge connected to the first winding such that the first switching bridge receives AC power from the first winding and converts the AC power to DC power;
        a second switching bridge including an output connected to the second winding and structured to receive the converted DC power from the first switching bridge, convert the DC power to AC power, and provide the converted AC power to the load in parallel combination with unconverted AC power from the second winding effective to augment the AC power provided to the load;
        a DC bridge connected between the first and second switching bridges; and
        a controller that controls each of the first and second switching bridges to reduce variations in the output voltage in the event of a change in the input voltage, the controller further controlling the first and second switching bridges to continuously control a power factor on the primary side of the hybrid transformer, the controller configured to disconnect the load from the source by opening the first and second switching bridges when the output current exceeds a predetermined limit or when the input voltage drops below a predetermined limit.

2. The hybrid transformer of claim 1, wherein the first and second windings are secondary windings and the third winding is the primary winding.

3. The hybrid transformer of claim 1, wherein the first and second windings are primary windings and the third winding is the secondary winding.

4. The hybrid transformer of claim 1, wherein the DC bridge comprises a plurality of capacitors and one or more taps for providing DC power to a DC load.

5. The hybrid transformer of claim 4, further comprising a normally open switch and a battery bank connected in parallel with the DC bridge, wherein when an interruption occurs in the input voltage, the switch closes, thereby providing DC power from the battery bank to the second switching bridge.

6. The hybrid transformer of claim 4, further comprising sensors and a monitoring device for monitor the operation of the hybrid transformer, the monitoring device being connected to the one or more taps to receive DC power from the DC bridge.

7. The hybrid transformer of claim 6, wherein the monitoring device is an intelligent electronic device (IED) that receives operational data of the hybrid transformer from the sensors, the operational data including currents, voltages and temperatures in the first, second and third windings.

8. The hybrid transformer of claim 7, wherein the IED comprises the controller.

9. The hybrid transformer of claim 8, wherein the IED is connected to a remotely located control center by a communication link, the IED transmitting the operational data to the control center and receiving, commands for the controller from the control center.

10. A hybrid transformer for receiving an input voltage and current from a source and providing an output including an output voltage and current to a load, the hybrid transformer comprising:
    a ferromagnetic core;
    a first winding, a second winding and a third winding wound around the core, wherein at least one of the first, second and third windings is a primary winding for connection to the source, and at least one of the first, second and third windings is a secondary winding for connection to the load; and, an AC-AC converter comprising:
a first switching bridge connected to the first winding;
a second switching bridge connected in series with the second winding;
a DC bridge connected between the first and second switching bridges; and
a controller that controls each of the first and second switching bridges to control the DC voltage across the DC bridge to reduce variations in the output voltage in the event of a change in the input voltage, wherein the controller is structured to operate the second switching bridge so as to receive DC power from the first switching bridge, convert the DC power to AC power, and provide the AC power to the load,
wherein the output power includes an AC power transmitted with the second winding unconverted by the first or second switching bridge in addition to the AC power provided with the second switching bridge.

11. The hybrid transformer of claim 10, further comprising sensors and an intelligent electronic device (IED) that is connected to a remotely located control center by a communication link, the IED comprising the controller and being operational to receive operational data from the sensors, transmit the operational data to the control center and receive commands for the controller from the control center.

12. A hybrid distribution transformer having a primary side for receiving an input voltage and a current from a source and a secondary side for providing an output power including an output voltage and a current to a load, the hybrid distribution transformer comprising:
a ferromagnetic core;
a first winding and a second winding wound around the core, the first winding having opposing ends, a plurality of turns disposed between the ends and a tap connected to one of the turns, the tap helping define winding portions of the first winding, and wherein one of the first and second windings is a primary winding for connection to the source, and the other one of the first and second windings is a secondary winding for connection to the load;
a power electronic module connected to the tap of the first winding and comprising an AC-AC converter including a first converter and a second converter, the first converter being connected in parallel with the second converter and the second converter including an output being connected to the tap; and
a control device that controls the power electronic module to receive AC power with the first converter, to convert the received AC power to DC power with the first converter, to receive the converted DC power with the second converter, to convert the DC power to AC power with the second converter, to provide the converted AC power to the load, to regulate variations in the output voltage, to increase voltage across the first winding, and to decrease voltage across the first winding, as well as to control a power factor on the primary side of the hybrid distribution transformer,
wherein the output power includes unconverted AC power transmitted with the first winding, and wherein only a portion of the AC power transmitted with the first winding is the AC power provided with the second converter.

13. The hybrid distribution transformer of claim 12, wherein the first winding is the primary winding and the second winding is the secondary winding.

14. the hybrid distribution transformer of claim 12 wherein the first winding is the secondary winding and the second winding is the primary winding.

15. The hybrid distribution transformer of claim 12, further comprising first and second switches, the first switch being connected in series with an input to the first converter and the second switch being connected in parallel with an output of the second converter.

16. The hybrid distribution transformer of claim 15, wherein each of the first and second switches is a mechanical switch, an electronic switch or a hybrid electronic/mechanical switch.

17. The hybrid distribution transformer of claim 15, wherein the first and second switches are controlled by the control device such that when the AC-AC converter is determined to be operating normally, the first switch is maintained in a closed position and the second switch is maintained in an open position, and when the AC-AC converter is determined to not be operating normally, the first switch is opened and the second switch is closed, thereby causing the AC-AC converter to be bypassed.

18. The hybrid distribution transformer of claim 15, further comprising a fault current limiting assembly comprising a normally open electronic switch connected in series with an inductor, the fault current limiting assembly being connected in parallel with the second switch and the second converter, the electronic switch being controlled by the control device such that when a fault is detected, the control device closes the electronic switch.

19. The hybrid distribution transformer of claim 12, wherein the AC-AC converter further comprises a DC bus having at least one capacitor and one or more DC taps.

20. The hybrid distribution transformer of claim 19, wherein the one or more DC taps comprise a plurality of taps at different DC voltage levels.

21. The hybrid distribution transformer of claim 12, wherein the first converter is connected in parallel with the first one of the winding portions using the tap and an end of the first winding.

22. The hybrid distribution transformer of claim 12, wherein the tap is a first tap and the first winding further comprising a second tap connected to another one of the turns of the first winding; and
wherein the first converter is connected in parallel with the first one of the winding portions using the first and second taps.

23. The hybrid distribution transformer of claim 12, wherein the hybrid transformer is a distribution transformer.

24. The hybrid distribution transformer of claim 12, further comprising sensors and an intelligent electronic device (IED) that is connected to a remotely located control center by a communication link, the IED comprising the controller and being operable to receive operational data from the sensors, transmit the operational data to the control center and receive commands for the controller from the control center.

25. The hybrid transformer of claim 1, wherein the AC-AC converter includes a filter including at least one passive component, an input connected with the output of the second switching bridge, and an output connected in series with the second winding.

26. The hybrid transformer of claim 1, wherein the output of the second switching bridge is directly connected to the second winding.

* * * * *